United States Patent
Cherney et al.

(10) Patent No.: US 11,472,416 B2
(45) Date of Patent: Oct. 18, 2022

(54) MULTI-DIMENSIONAL MOBILE MACHINE PATH VISUALIZATION AND CONTROL SYSTEM

(71) Applicant: Deere & Company, Moline, IL (US)

(72) Inventors: Mark J. Cherney, Potosi, WI (US); Jena M. Bartodziej, Seattle, WA (US); Nathaniel M. Czarnecki, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/863,398

(22) Filed: Apr. 30, 2020

(65) Prior Publication Data
US 2021/0339753 A1    Nov. 4, 2021

(51) Int. Cl.
*B60W 40/076* (2012.01)
*B60W 50/14* (2020.01)
*B60W 30/18* (2012.01)

(52) U.S. Cl.
CPC .... *B60W 40/076* (2013.01); *B60W 30/18036* (2013.01); *B60W 50/14* (2013.01); *B60W 2050/146* (2013.01); *B60W 2300/17* (2013.01); *B60W 2420/42* (2013.01); *B60W 2510/12* (2013.01); *B60W 2520/16* (2013.01); *B60W 2520/18* (2013.01); *B60W 2520/22* (2013.01);
(Continued)

(58) Field of Classification Search
CPC ............... B60W 40/076; B60W 50/14; B60W 2520/22; B60W 2520/18; B60W 2510/12; B60W 2554/802; B60W 2540/18; B60W 2420/42; B60W 2554/4049; B60W 2520/16; B60W 2300/17; B60W 2050/146; B60W 30/18036
See application file for complete search history.

(56) References Cited

U.S. PATENT DOCUMENTS

| | | |
|---|---|---|
| 7,418,318 B2 | 8/2008 | Hrabak et al. |
| 7,984,574 B2 | 7/2011 | Pfohl et al. |
| 8,548,680 B2 | 10/2013 | Ryerson et al. |

(Continued)

FOREIGN PATENT DOCUMENTS

| | | | | |
|---|---|---|---|---|
| DE | 102012004198 A1 | * | 10/2012 | ............. B60K 35/00 |
| DE | 102019114667 A1 | | 12/2020 | |

(Continued)

OTHER PUBLICATIONS

F.Xu, L. Chen, J. Lou, and M.Ren, "A real-time road detection method based on reorganized lidar data", PLOS ONE, Published: Apr. 16, 2019; https://doi.org/10.1371/journal.pone.0215159 (Year: 2019).*

(Continued)

*Primary Examiner* — Peter D Nolan
*Assistant Examiner* — Tanya C Sienko
(74) *Attorney, Agent, or Firm* — Christopher J. Volkmann; Kelly, Holt & Christenson, PLLC

(57) ABSTRACT

A method of controlling a mobile machine having a set of ground engaging elements includes receiving an image of terrain proximate the mobile machine, detecting a contour of the terrain, determining a projected path of the set of ground engaging elements based on the detected contour of the terrain, and controlling a display device to display the image with an overlay representing the projected path of the ground engaging elements.

20 Claims, 18 Drawing Sheets

(52) U.S. Cl.
CPC ............... *B60W 2540/18* (2013.01); *B60W 2554/4049* (2020.02); *B60W 2554/802* (2020.02)

(56) References Cited

U.S. PATENT DOCUMENTS

| | | | |
|---|---|---|---|
| 9,463,741 B2 | 10/2016 | Fukuda et al. | |
| 10,882,538 B1* | 1/2021 | Witt | G01S 15/931 |
| 2006/0274147 A1 | 12/2006 | Chinomi et al. | |
| 2009/0043462 A1* | 2/2009 | Stratton | E02F 9/26 701/50 |
| 2012/0083982 A1* | 4/2012 | Bonefas | G05D 1/0223 382/153 |
| 2014/0236477 A1* | 8/2014 | Chen | G01S 13/865 701/450 |
| 2014/0247328 A1* | 9/2014 | Popham | B60W 50/14 348/49 |
| 2015/0166062 A1* | 6/2015 | Johnson | B60W 10/20 701/41 |
| 2015/0199847 A1* | 7/2015 | Johnson | G02B 27/0093 345/633 |
| 2015/0353095 A1* | 12/2015 | Freess | B60W 30/18009 701/1 |
| 2016/0257341 A1* | 9/2016 | Lavoie | B60W 30/18036 |
| 2016/0263997 A1 | 9/2016 | Mizutani | |
| 2016/0353049 A1* | 12/2016 | Maley | G06T 11/20 |
| 2018/0022347 A1* | 1/2018 | Myers | G01S 13/867 701/26 |
| 2018/0215382 A1* | 8/2018 | Gupta | G08G 1/166 |
| 2019/0261550 A1* | 8/2019 | Damme | A01B 69/008 |
| 2020/0326713 A1* | 10/2020 | Spielman | G05D 1/0248 |

FOREIGN PATENT DOCUMENTS

| | | | |
|---|---|---|---|
| JP | 2013-142228 A | | 7/2013 |
| JP | 2018156550 A | * | 10/2018 |
| WO | WO2019104368 A1 | | 6/2019 |

OTHER PUBLICATIONS

To Go the Distance, We Built Systems That Could Better Perceive It (NVIDIA Blog), Jun. 19, 2019, https://blogs.nvidia.com/blog/2019/06/19/drive-labs-distance-to-object-detection/Video on YouTube is https://youtu.be/ftsUg5VIzIE (Year: 2019).*
02014 Nissan Versa Around View Monitor challenge, YouTube video, Jun. 20, 2013 https://youtu.be/zLhLtM5BHfA (0:35-0:46) (Year: 2013).*
"Method and System for Providing Road Steepness Overlay for Computer Generated Maps", Published: Sep. 14, 2011, 2 pages.
Application and Drawings for U.S. Appl. No. 16/567,735 dated Sep. 11, 2019, 46 pages.
Application and Drawings for U.S. Appl. No. 16/567,789 dated Sep. 11, 2019, 46 pages.
Non-Final Office Action for U.S. Appl. No. 16/567,735 dated Jan. 4, 2022, 26 pages.
Akhavian, R. and Behzadan, A.H., 2015. Construction equipment activity recognition for simulation input modeling using mobile sensors and machine learning classifiers. Advanced Engineering Informatics, 29(4), pp. 867-877.
Damerow, F., Li, Y., Puphal, T., Flade, B. and Eggert, J., 2018. Intersection warning system for occlusion risks using relational local dynamic maps. IEEE Intelligent Transportation Systems Magazine, 10(4), pp. 47-59.
Non-Final Office Action for U.S. Appl. No. 16/567,789 dated Nov. 24, 2021, 9 pages.
German Search Report issued in application No. DE102021203109.9 dated Nov. 24, 2021 (06 pages).
Final Office Action for U.S. Appl. No. 16/567,789 dated May 25, 2022, 13 pages.
Search Report for German Patent Application No. 102020210179.5 dated Jul. 15, 2022, 4 pages.
Final Office Action for U.S. Appl. No. 16/567,735 dated Jul. 27, 2022, 22 pages.
Non-Final Office Action for U.S. Appl. No. 16/567,789 dated Aug. 4, 2022, 12 pages.

* cited by examiner

MULTI-DIMENSIONAL MOBILE MACHINE PATH VISUALIZATION AND CONTROL SYSTEM

FIELD OF THE DESCRIPTION

The present description generally relates to mobile machines. More specifically, but not by limitation, the present description relates to a visualization and control system for a mobile machine that uses a multi-dimensional overlay to represent the machine path, such as a rear path when the machine is moving in reverse.

BACKGROUND

There are many different types of mobile machines. Some mobile machines include mobile work machines, such as construction machines, turf management machines, forestry machines, agricultural machines, among others. Another example of a mobile machine includes an automobile. Many of these pieces of mobile equipment have controllable subsystems, that include mechanisms that are controlled by the operator in performing operations.

For instance, a construction machine can have multiple different mechanical, electrical, hydraulic, pneumatic and electro-mechanical subsystems, among others, all of which can be operated by the operator. Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders, graders, and excavators, among others.

Worksite operations may involve a large number of steps or phases and may be quite complex. Further, the worksite operations often require precise machine control by an operator. Some maneuvers on the worksite require the operator to operate the machine in a reverse direction, to back the machine across the worksite. In doing so, there are often blind spots, or areas that are difficult for the operator to observe, even with the use of mirrors or rear vision systems such as back-up cameras. This increases the risk of undesired machine contact with objects on the worksite, such as other machines, people, worksite materials, etc., and can be exacerbated on uneven or sloped terrain.

The discussion above is merely provided for general background information and is not intended to be used as an aid in determining the scope of the claimed subject matter.

SUMMARY

A method of controlling a mobile machine having a set of ground engaging elements includes receiving an image of terrain proximate the mobile machine, detecting a contour of the terrain, determining a projected path of the set of ground engaging elements based on the detected contour of the terrain, and controlling a display device to display the image with an overlay representing the projected path of the ground engaging elements.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4-1, 4-2, and 4-3 (collectively referred to as FIG. 4) provide a flow diagram illustrating an example operation of a multi-dimensional machine path detection and visualization system.

FIGS. 8-1 and 8-2 (collectively referred to as FIG. 8) provide a flow diagram illustrating an example operation of a machine path detection system.

FIGS. 10-1 and 10-2 (collectively referred to as FIG. 10) illustrate an example mesh grid generated from the image shown in FIG. 9.

DETAILED DESCRIPTION

The present description generally relates to mobile machines. More specifically, but not by limitation, the present description relates to a visualization and control system for a mobile machine that uses a multi-dimensional overlay to represent the machine path, such as a rear path when the machine is moving in reverse.

Figure 1:
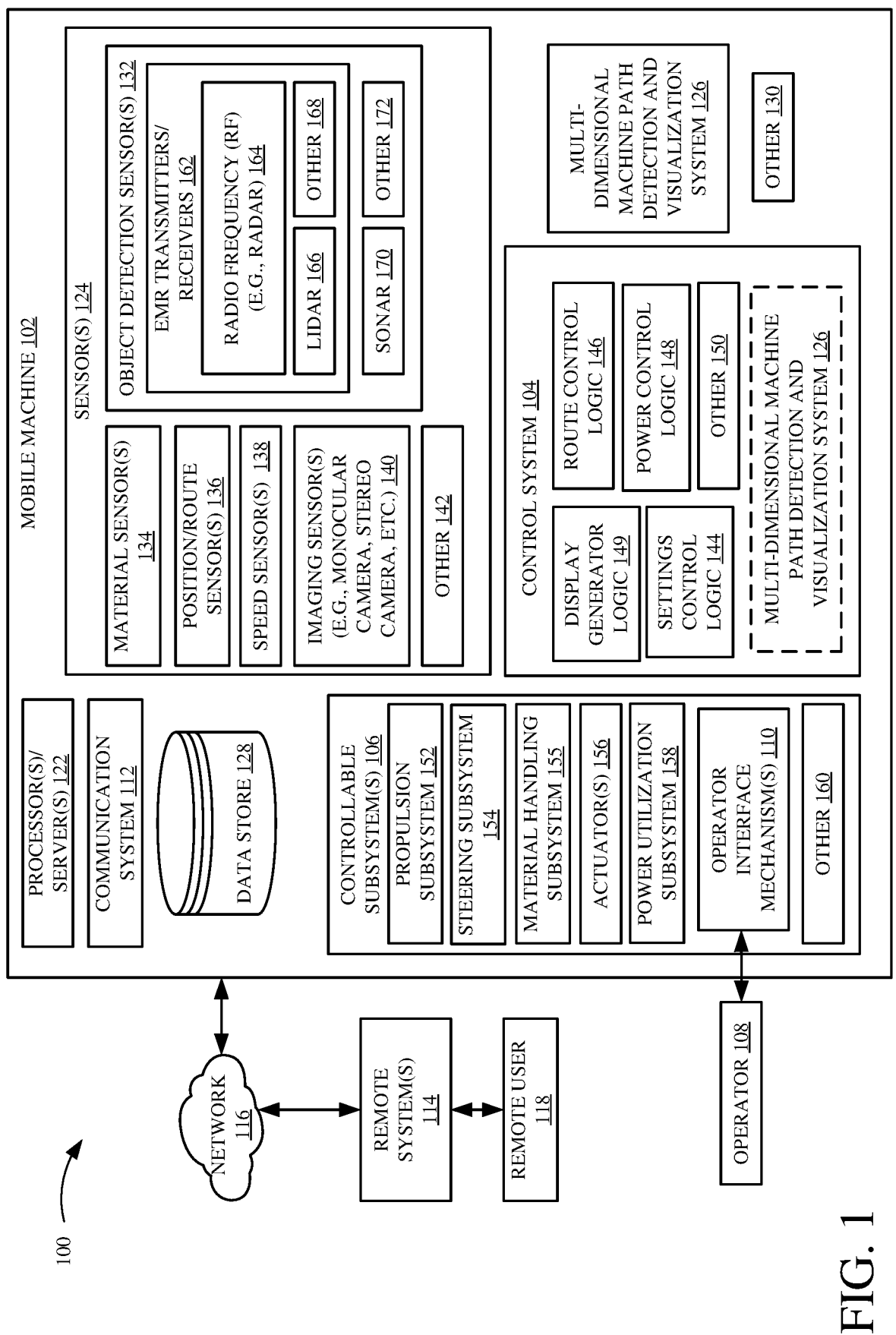
FIG. 1 is a block diagram showing one example of a mobile machine architecture that includes a mobile machine.

FIG. 1 is a block diagram showing one example of a mobile machine architecture 100 that includes a mobile machine 102 having a set of ground engaging elements (e.g., wheels, tracks, etc.). As noted above, mobile machine 102 can include a wide variety of different machine types. For instance, machine 102 can include an automobile. In another example, machine 102 comprises a work machine, such as a construction machine, turf management machine, forestry machine, agricultural machine, etc.

Mobile machine 102 includes a control system 104 configured to control a set of controllable subsystems 106 that perform operations for machine 102. For instance, an operator 108 can interact with and control mobile machine 102 through operator interface mechanism(s) 110. Operator interface mechanism(s) 110 can include such things as a steering wheel, pedals, levers, joysticks, buttons, dials, linkages, etc. In addition, they can include a display device that displays user actuatable elements, such as icons, links, buttons, etc. Where the device is a touch sensitive display, those user actuatable items can be actuated by touch gestures. Similarly, where mechanism(s) 110 includes speech processing mechanisms, then operator 108 can provide inputs and receive outputs through a microphone and speaker, respectively. Operator interface mechanism(s) 110 can include any of a wide variety of other audio, visual or haptic mechanisms.

Mobile machine 102 includes a communication system 112 configured to communicate with other systems or machines in architecture 100. For example, communication system 112 can communicate with other local machines, such as other machines operating on a same area or worksite as mobile machine 102. In the illustrated example, communication system 112 is configured to communicate with one or more remote systems 114 over a network 116. Network 116 can be any of a wide variety of different types of networks. For instance, it can be a wide area network, a local area network, a near field communication network, a cellular communication network, or any of a wide variety of other networks, or combinations of networks.

A remote user 118 is illustrated as interacting with remote system 114, such as to receive communications from or send communications to mobile machine 102 through communication system 112. For example, but not by limitation, remote user 118 can receive communications, such as notifications, requests for assistance, etc., from mobile machine 102 on a mobile device.

FIG. 1 also shows that mobile machine 102 includes one or more processors 122, one or more sensors 124, a multi-dimensional machine path detection and visualization system 126 (also referred to as "machine path detection system 126"), a data store 128, and can include other items 130 as well. Sensor(s) 124 can include any of a wide variety of sensors depending on the type of mobile machine 102. For instance, sensors 124 can include object detection sensor(s) 132, material sensor(s) 134, position/route sensor(s) 136, speed sensor(s) 138, imaging sensor(s) 140, and can include other sensors 142 as well.

Material sensor(s) 134 are configured to sense material being moved, processed, or otherwise worked on by mobile machine 102. Speed sensor(s) 138 are configured to output a signal indicative of a speed of mobile machine 102.

Position/route sensor(s) 136 are configured to identify a position of mobile machine 102 and a corresponding route (e.g., heading) of mobile machine 102 as it traverses the worksite. Sensor(s) 136 include one or more sensors configured to generate signals indicative of an angle or turn radius of machine 102. This can include, but is not limited to, steering angle sensors, articulation angle sensors, wheel speed sensors, differential drive signals, gyroscopes, to name a few.

Worksite imaging sensor(s) 140 are configured to obtain images of an area (e.g., worksite) in which machine 102 is operating. For example, in the case of a work machine, sensor(s) obtain images of a worksite (e.g., agricultural field, construction site, etc.), which can be processed to identify objects or conditions of the worksite. Examples of imaging sensor(s) 140 include, but are not limited to, a camera (e.g., a monocular camera, stereo camera, etc.) that obtains still images, a time-series of images, and/or video feed of an area of a worksite. For instance, the field of view (FOV) of the camera includes an area of the worksite that is to the rear of machine 102, and which may not otherwise be visible to operator 108 while in the operator compartment or cab of machine 102.

Object detection sensors 132 can include electromagnetic radiation (EMR) transmitters and receivers (or transceiver(s)) 162. Examples of EMR transmitters/receivers include radio frequency (RF) devices 164 (such as RADAR), LIDAR devices 166, and can include other devices 168 as well. Object detection sensors 132 can also include sonar devices 170, and can include other devices 172 as well.

Control system 104 can include settings control logic 144, route control logic 146, power control logic 148, display generator logic 149, and it can include other items 150. As illustrated by the dashed box in FIG. 1, control system 104 can include some, or all, components and features of machine path detection system 126.

Controllable subsystems 106 can include propulsion subsystem 152, steering subsystem 154, material handling subsystem 155, one or more different actuators 156 that can be used to change machine settings, machine configuration, etc., power utilization subsystem 158, and it can include a wide variety of other systems 160, some of which are described below. In one example, controllable subsystems 106 include operator interface mechanism(s) 110, such as display devices, audio output devices, haptic feedback mechanisms, as well as input mechanisms. Examples are discussed in further detail below.

Settings control logic 144 can control one or more of subsystems 106 in order to change machine settings based upon objects, conditions, and/or characteristics of the worksite. By way of example, settings control logic 144 can actuate actuators 156 that change the operation of material handling subsystem 155, propulsion subsystem 152, and/or steering subsystem 154.

Route control logic 146 can control steering subsystem 154. By way of example, but not by limitation, if an object is detected by machine path detection system 126, route control logic 146 can control propulsion subsystem 152 and/or steering subsystem 154 to avoid the detected object.

Power control logic 148 generates control signals to control power utilization subsystem 158. For instance, it can allocate power to different subsystems, generally increase power utilization or decrease power utilization, etc. These are just examples and a wide variety of other control systems can be used to control other controllable subsystems in different ways as well.

Display generator logic 149 illustratively generates a control signal to control a display device, to generate a user interface display for operator 108. The display can be an interactive display with user input mechanisms for interaction by operator 108.

Machine path detection system 126 is configured to receive signals from sensor(s) 124 and, based on those signals, determine a projected machine path (i.e., a path of the ground engaging traction elements of machine 102) in multi-dimensions based on a detected contour of the terrain on which machine 102 is operating. Machine path detection system 126 is further configured to visualize the machine path to operator 108. In one example, the visualization includes displaying a multi-dimensional overlay, representing a projected path of the ground engaging traction elements, on an image of the terrain.

Further, machine path detection system 126 can detect and visualize objects that are proximate machine 102 and/or in potentially in the machine path (e.g., in a rear path of machine 102) based on image processing on those images and/or signals from sensor(s) 132. As such, the system can assist operator 108 in avoiding objects while backing up.

Before discussing machine path detection system 126 in further detail, an example of a mobile machine will be discussed with respect to FIG. 2.

As noted above, mobile machines can take a wide variety of different forms. FIG. 2 is a pictorial illustration showing one example of a mobile machine 200, in the form of a mobile work machine (illustratively an off-road construction vehicle), with a machine path detection and visualization system 201 (e.g., machine path detection system 126) (also referred to as "machine path detection system 201") and a control system 202 (e.g., 104). While machine 200 illustratively comprises a wheel loader, a wide variety of other mobile work machines may be used as well. This can include other construction machines (e.g., bull dozers, motor graders, etc.), agricultural machines (e.g., tractor, combine, etc.), to name a few.

Machine 200 includes a cab 214 having a display device 215, ground-engaging element(s) 228 (e.g., wheels), motor(s) 204, speed sensor(s) 206, a frame 216, and a boom assembly 218. Boom assembly 218 includes a boom 222, a boom cylinder 224, a bucket 220 and a bucket cylinder 226. Boom 222 is pivotally coupled to frame 216 and may be raised and lowered by extending or retracting boom cylinder 224. Bucket 220 is pivotally coupled to boom 222 and may be moved through an extension or retraction of bucket cylinder 226. During operation, mobile machine 200 can be controlled by an operator within cab 214 in which mobile machine 200 can traverse a worksite. In one example, each one of motor(s) 204 are illustratively coupled to, and configured to drive, wheel(s) 228 of mobile machine 200. Speed sensor(s) 206 are illustratively coupled to each one of motor(s) 204 to detect a motor operating speed.

In the illustrated example, machine 200 comprises an articulating body where a front portion 229 is pivotally connected to a rear portion 231 at a pivot joint 233. An articulation sensor can be utilized to determine the articulation angle, at pivot joint 233, which can be used to determine the path of machine 200. In another example in which the body of machine 200 is non-articulating, the angle of the front and/or rear wheels 228 is rotatable relative to the frame.

Machine path detection system 201 determines a projected path of machine 200 along terrain 235 and can detect object located within a range of machine 200. In the illustrated example, machine path detection system 201 receives signals from object detection sensor(s) 205 and from imaging sensor(s) 207 (e.g., a monocular camera) which are illustratively mounted at a rear end 209 of machine 200. The components of machine path detection system 201 and/or system 202 communicate over a CAN network of machine 200, in one example.

Object detection sensor(s) 205 are configured to send a detection signal from rear end 209 of machine 200 and receives reflections of the detection signal to detect one or more objects behind machine 200. In one example, the detection signal comprises electromagnetic radiation transmitted to the rear of machine 200. For instance, this can include radio frequency (RF) signals. Some particular examples include radar and LORAN, to name a few.

In other examples, object detection sensor(s) 205 utilize sonar, ultrasound, as well as light (e.g., LIDAR) to image objects. Example LIDAR systems utilize ultraviolet light, visible light, and/or near infrared light to image objects.

Of course, other types of object detectors can be utilized. In any case, object detection sensor(s) 205 generate outputs indicative of objects, which can be utilized by control system 202 to control operation of machine 200.

Figure 3:
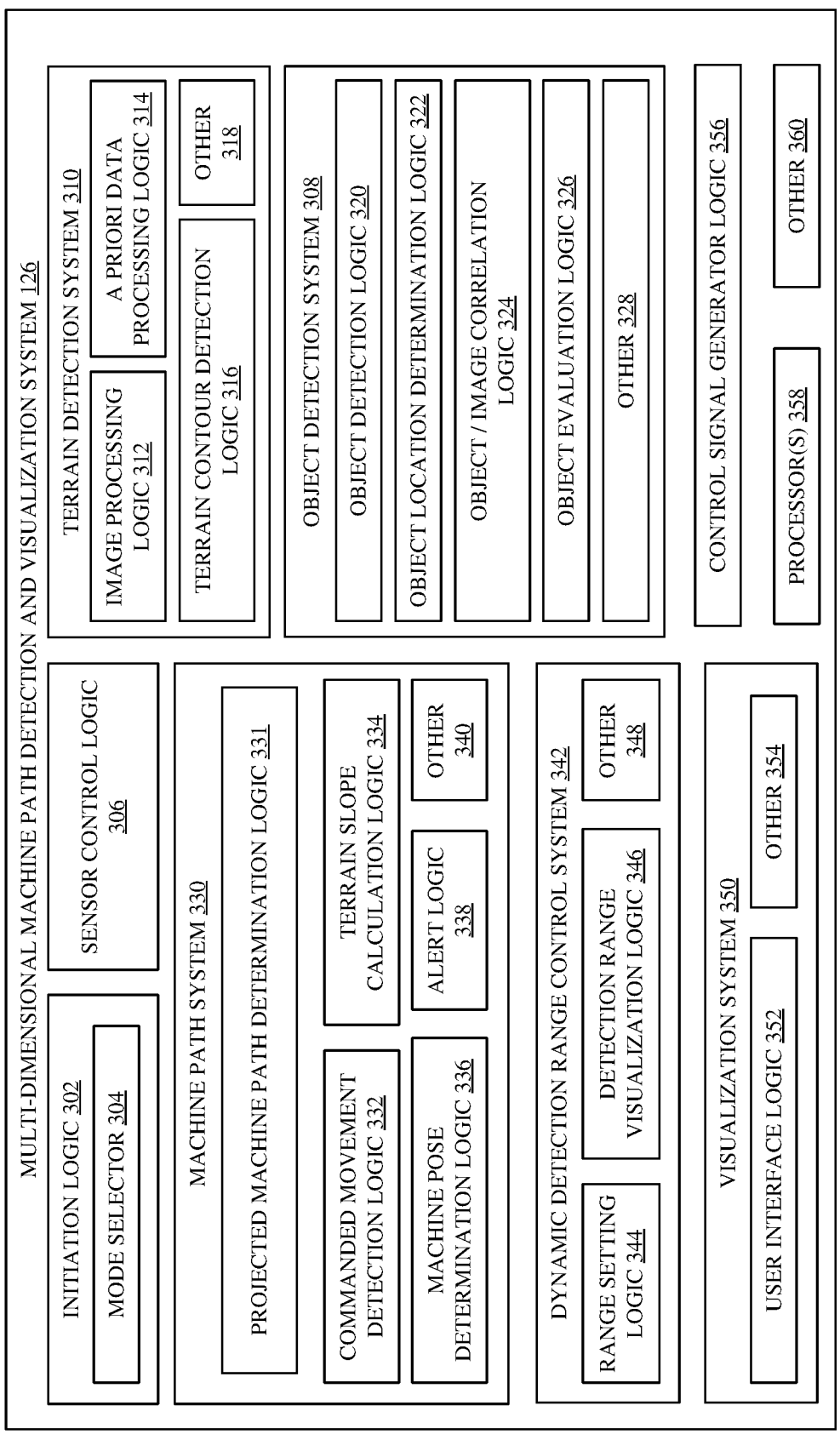
FIG. 3 is a block diagram illustrating one example of a multi-dimensional machine path detection and visualization system.

FIG. 3 illustrates one example of machine path detection system 126, illustrated in FIG. 1. Machine path detection system 126 is configured to determine a projected path of machine 102, in multiple-dimensions, along a terrain and to generate a visualization of the projected machine path to operator 108. Therefore, instead merely providing operator 108 with a visualization of a machine path constrained to a horizontal plane, machine path detection system 126 uses a detected contour of the terrain to determine projected changes to the machine's pose (e.g., pitch, roll, etc.) as the machine moves along the terrain. Also, objects can be detected on the terrain and fused with the images to provide the operator an indication of where in the image frames the detected objects are located.

Machine path detection system 126 includes initiation logic 302 configured to initiate and control machine path detection performed by machine path detection system 126. For example, this can be in response to a mode selector 304 determining that machine 102 has entered a particular mode for which machine path detection system 126 is to be initiated. For example, this can be in response to determining that machine 102 is backing up, or is preparing to back up, etc., by sensing operator inputs and/or machine settings.

Sensor control logic 306 is configured to control sensors 132 to transmit detection signals and to receive corresponding reflections of the detection signal, which can be used by object detection system 308 to detect the presence of objects on the worksite. Logic 306 also controls sensors 140 to acquire images of the worksite. In the illustrated example, the images are acquired in a rearward direction of machine 102, and represent the area of the terrain over which machine 102 will move during a reverse operation.

A terrain detection system 310 is configured to detect the terrain of the worksite on which machine 102 is operating. System 310 illustratively includes image processing logic 312 configured to process images acquired by imaging sensor(s) 140. Also, system 310 can include a priori data processing logic 314 configured to receive and process a priori data representing the terrain. For example, a priori data in the form of a terrain map can be received from remote system 114.

Terrain contour detection logic 316 is configured to detect a contour of the terrain based on the processed images and/or received terrain data. Terrain detection system 310 can include other items 318 as well.

Object detection system 308 includes object detection logic 320 configured to detect objects on the terrain based on the image processing performed by logic 312. Object location determination logic 322 is configured to determine a location of the object(s) detected by logic 320. Object/image correlation logic 324 is configured to correlate the object location determined by logic 322 with a portion of an image captured by the imaging sensor(s). System 308 also includes object evaluation logic 326 configured to evaluate the object based on the image processing performed by logic 312. This can include, but is not limited to, object size detection, object shape detection, object classification, etc. System 308 can include other items 328 as well.

Machine path detection system 126 also includes a machine path system 330 having projected machine path determination logic 331. Logic 331 is configured to determine a projected machine path based on a commanded movement of machine 102, detected by commanded movement detection logic 332. For example, logic 332 can detect inputs (e.g., steering inputs, etc.) by operator 108 indicating a direction of movement of machine 102. Examples are discussed in further detail below. Once the projected machine path is determined based on the detected commanded movement, system 330 can identify a slope of the terrain at each of a plurality of positions along the projected machine path. Illustratively, terrain slope calculation logic 334 can calculate one or more of a longitudinal slope of the terrain (i.e., the slope of the terrain in the direction of travel of machine 102) and/or the transverse slope of the terrain (i.e., the slope of the terrain across the machine path, or orthogonal to the direction of travel of machine 102).

Machine pose determination logic 336 is configured to determine a pose of the machine at each of the plurality of positions, based on the terrain slope calculated by logic 334 and the projected location of the ground engaging element of machine 102 as machine 102 travels along the projected machine path. For example, logic 336 can identify changes to the machine pitch and/or roll at the various positions along the projected machine path. System 330 also includes alert logic 338 configured to identify alert triggering criteria for triggering alerts based on the projected machine path. For example, the alerts can identify a threshold pitch and/or roll of machine 102, for which operator 108 is to be alerted. Alternatively, or in addition, subsystem(s) 106 of machine 102 can be automatically controlled based on generation of an alert. System 330 can include other items 340 as well.

Machine path detection system 126 also includes a dynamic detection range control system 342. System 342 is configured to dynamically control a detection range of machine path detection system 126. System 342 is illustrated as including range setting logic 344 configured to receive user settings for detection range control and detection range visualization logic 346. System 342 can include other items 348 as well.

Range setting logic 344 is configured to set the detection range based on one or more inputs. For example, a detection range controls the range of operation of object detection system 308 and/or terrain detection system 310. The range can be set based on user input, automatically, or otherwise. Detection range visualization logic 346 is configured to generate a visualization of the detection range. For instance, this includes generating range lines that are output by visualization system 350 in conjunction with the images.

System 350 includes user interface logic 352 configured to generate user interface displays and receive user inputs from operator 108. System 350 can include other items 354 as well.

Machine path detection system 126 also includes control signal generator logic 356 configured to generate control signals that are output by machine path detection system 126 for control of controllable subsystem(s) 106, or other machines or systems in architecture 100. Machine path detection system 126 is also illustrated as including one or more processors 358 and can include other items 360 as well.

FIGS. 4-1, 4-2, and 4-3 (collectively referred to as FIG. 4) provides a flow diagram 400 illustrating an example operation of machine path detection system 126. For sake of illustration, but not by limitation, FIG. 4 will be described in the context of mobile machine 102 having machine path detection system 126.

At block 402, initiation logic 302 initiates machine path detection. This can be in response to a manual input by operator 108, such as operator 108 actuating an input mechanism. This is represented by block 404. Alternatively, or in addition, machine path detection system 126 can be initiated automatically, such as in response to detection that machine 102 has entered a predetermined operating mode, such as being shifted into reverse. This is represented by block 406. Of course, machine path detection system 126 can be initiated in other ways as well. This is represented by block 408.

At block 410, the detection range is dynamically adjusted by system 342. As mentioned above, the detection range controls an extent (e.g., a distance from machine 102) that system 310 detects the terrain and/or object detection system 308 detects objects. Alternatively, or in addition, the detection range can be utilized to control the visualization of the machine path. This is discussed in further detail below.

The detection range can be user selected, such as by a manual selection by operator 108 through operator interface mechanisms 110 and/or based on user preferences associated with operator 108. This is represented by block 412. Alternatively, or in addition, the detection range can be dynamically set automatically. This is represented by block 414. For example, the detection range can be based on detected operating characteristics of machine 102, such as a target operation, machine speed, machine configuration, etc. In another example, it is based on the worksite on which machine 102 has operated. Of course, the detection range can be automatically set or adjusted in other ways as well. This is represented by block 416.

At block 418, system(s) and/or sensor(s) of machine 102 are controlled based on the detection range. For example, at block 419, machine path system 330 is controlled to determine the projected machine path within the detection range. This can include controlling the image sensor(s) 140 that obtain the images upon which the machine path determination is based, as well as controlling terrain detection system 310 and/or visualization system 350 to limit the machine path detection and visualization to the detection range. Also, object detection system 308 can be controlled based on the detection range (block 420). For instance, object detection sensor(s) 132 (e.g., radar sensor(s)) can be controlled to limit object detection to the detection range. This can include, for instance, sensor control logic 306 controlling a range of a transceiver (e.g., a radar transceiver) that transmits and receives a detection signal, used by object detection logic 320 to detect objects on the terrain.

At block 422, image(s) of the worksite proximate machine 102 are received. The images can comprise a time-series of images or video. This is represented by block 424. Of course, the images can be received in other ways as well. This is represented by block 425.

In one example, the images are received from a rear facing camera (e.g., imaging sensor(s) 140, 205). This is represented by block 426. Of course, the images can be received from other imaging sensors as well. This is represented by block 428.

At block 430, image processing is performed by logic 312 on the image(s) received at block 422. Examples of image processing are discussed in further detail below. Briefly, however, logic 312 can generate a three-dimensional point cloud that represents the surface of the terrain and any objects located on or in proximity to the terrain.

At block 432, the contour of the terrain is detected. In one example, this is based on the images processed at block 430. This is represented by block 434. For example, the terrain contour is determined from the three-dimensional point cloud, generated by logic 312. Alternatively, or in addition, the contour of the terrain can be detected based on signals from other sensors, such as, but not limited to, EMR transmitters/receivers 162, SONAR 170, gyroscopes, accelerometers, etc. This is represented by block 436. The contour can be detected based on a priori data obtained by machine 102. For example, the a priori data can be received from remote system 114 in the form of a terrain map. This is represented by block 438. Of course, the contour can be detected in other ways as well. This is represented by block 440.

At block 442, object(s) are detected on the terrain. In one example, at block 444, this is based on the images processed at block 430 (e.g., based on the three-dimensional point cloud generated by logic 312). For example, image processing can determine the size, shape, and/or location of an object. Alternatively, or in addition, objects can be detected based on signals from other sensors. This is represented by block 446. For example, signals from sensor(s) 132 can be used to identify the objects. Also, a priori data can be used to identify the objects. This is represented by block 448. Of course, objects can be detected in other ways as well. This is represented by block 450.

At block 452, a location of each object is determined relative to machine 102. For example, the location of an object can be determined based on a detected distance of the object from the sensor mounting location on machine 102, that is an estimated distance of the object from the sensor. Alternatively, or in addition, the location can be determined based on an angle that the detected object is relative to the sensor mounting location. These, of course, are by way of example only.

At block 454, sensor signal(s) representing a commanded movement of machine 102 are received. For example, this can include signals indicative of wheel speed (block 456), steering angle (block 458), articulation angle (block 460), differential drive speed (block 462), a gyroscope (block 464), and it can include other signals (block 466) as well.

Figure 2:
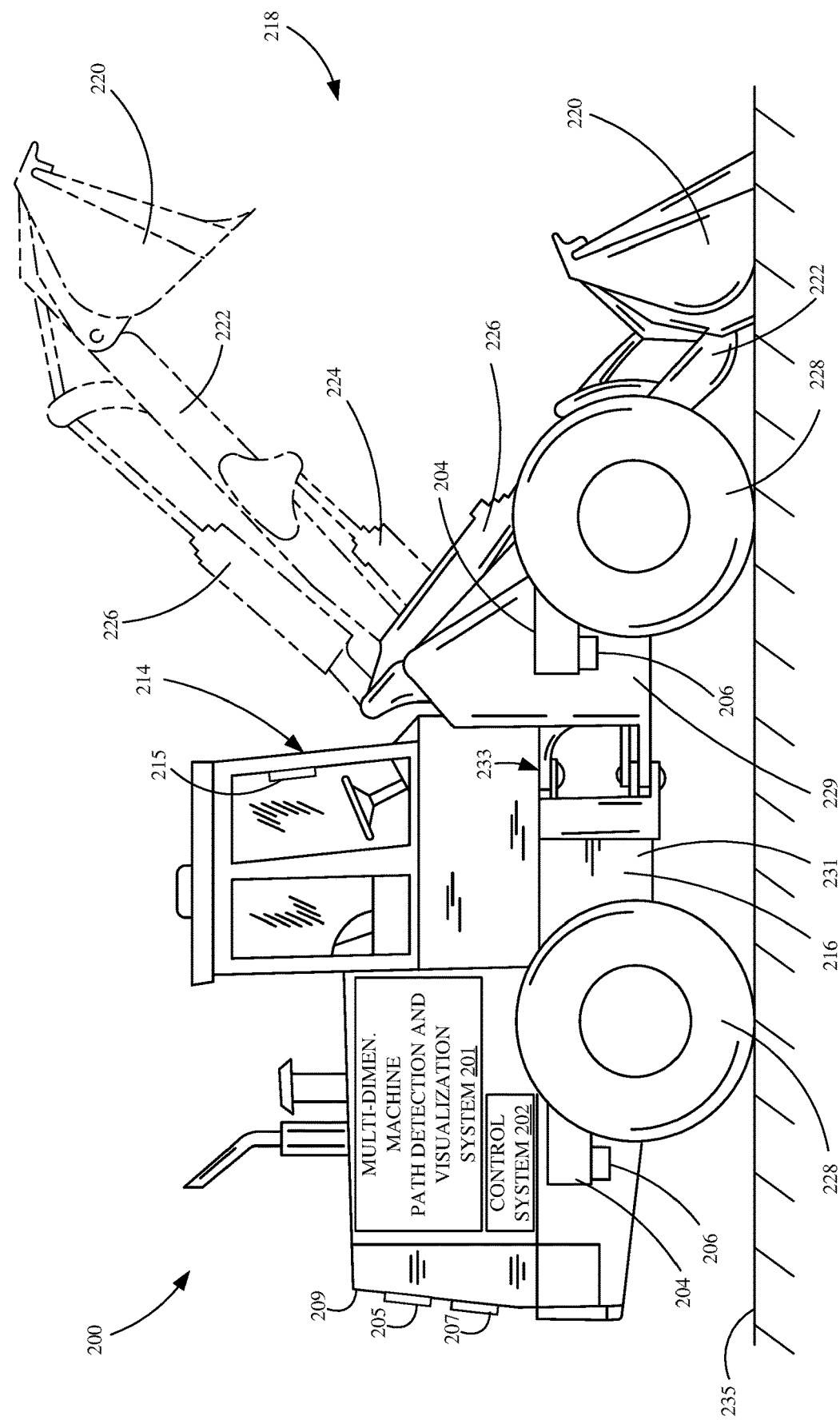
FIG. 2 is a pictorial illustration showing one example of a mobile machine.

Referring to the example shown in FIG. 2, steering angle (block 458) is indicative of an angle of the front and/or rear wheels relative to the frame of machine 200. Articulation angle (block 460) is indicative of the articulation angle between the front portion 229 and rear portion 231. Differential drive speed (block 462) is indicative of a difference between drive speeds of traction elements on opposite sides of the machine. For example, in the case of skid steer machines, the differential drive speed indicates a difference in direction and/or speed of the wheels or tracks on the left side of the machine from the right side of the machine. The average of the two speeds gives a forward or aft speed. The radius of curvature of the path of the machine can be determined based on the velocity, or ground speed of the machine's wheels or tracks and the degrees/second that the machine is driving above the curve.

At block 468, a projected path of machine 102 is determined based on the based on the detected contour of the terrain, detected at block 432, and based on the sensor signal(s) received at block 454. At block 470, terrain characteristics are determined at each of a plurality of locations along the projected machine path. For example, this can include detecting the longitudinal slope (block 472) and/or transverse slope (block 474) of the terrain at the plurality of locations. Of course, other terrain characteristics can be determined as well. This is represented by block 476.

At block 478, the position (such as elevation or relative height) of the ground engaging elements (e.g., wheels, tracks, etc.) of machine 102 is determined at each of the plurality of locations along the path. Block 478 illustratively determines the change in elevation of each of the ground engaging elements of machine 102 as machine 102 traverses the projected machine path.

Based on the information determined at block 478, a machine pose at each of the plurality of locations is determined at block 480. For example, block 480 can identify the pitch (block 482), and/or roll (block 484) of machine 102. Of course, other machine pose characteristics can be determined as well. This is represented by block 486.

At block 488, alert triggering criterion is applied to the terrain characteristics determined at block 470 and/or machine pose determined at block 480. If an alert triggering criterion is met, an alert is generated, and can be utilized to control machine 102 (or other machines or systems in architecture 100). For example, the generated alert can be output to operator 108. This can include an indication to operator 108 of the terrain characteristics and/or machine pose. Alternatively, or in addition, the generated alert can be utilized by control system 104 to automatically control subsystem(s) 106, such as to control steering and/or ground speed.

The alert triggering criterion can be defined in any of a variety of ways. For example, it can be predefined (block 490), and it can be used selected (block 492). Also, the triggering criterion can be based on the machine configuration/settings. This is represented by block 494. For example, machine configuration/settings can include components that are coupled to or installed on the machine. For instance, the machine configuration information can indicate the type of bucket being used by machine 200, illustrated in FIG. 2. In another example, it can be based on the machine speed setting.

Also, the alert triggering criterion can be based on operational characteristics. This is represented by block 496. For example, a triggering criterion can be based on the load (e.g., weight) being carried in bucket 220. Of course, alert triggering criterion can be selected in other ways as well.

Examples of alert triggering criterion can include a threshold pitch (block 500) and/or threshold roll (block 502). Of course, the alert triggering criterion can include other types of criterion as well. This is represented by block 504.

To illustrate, for a given position and load in bucket 220, the alert triggering criterion at block 488 can indicate a threshold pitch and/or roll for machine 200 at which an alert will be generated. This threshold, in one example, is selected to avoid an unstable condition that could result in machine 200 tipping over or otherwise experiencing poor performance or an unsafe operating condition.

At block 506, a control signal is generated to control machine 102 based on the projected machine path determined at block 468, the terrain characteristics determined at block 470, and/or the machine pose determined at block 480. Also, the machine can be controlled based on the determined locations of any objects relative to machine 102, determined at block 452. Also, the machine can be controlled based on the alert triggering criterion applied at block 488.

In one example, the control signal controls one or more subsystems 106. This is represented by block 508. For example, a signal can control propulsion subsystem 152 and/or steering subsystem 154 based on the machine pose expected along the projected machine path.

In one example, operator interface mechanism(s) 110 is controlled at block 510. For example, operator interface mechanism(s) 110 can be controlled to render visual, audio, haptic, or other types of outputs to operator 108. Of course, machine 102 can be controlled in other ways as well. This is represented by block 512. At block 514, if operation of machine path detection system 126 is continued, operation returns to block 510.

Figures 1, 4:
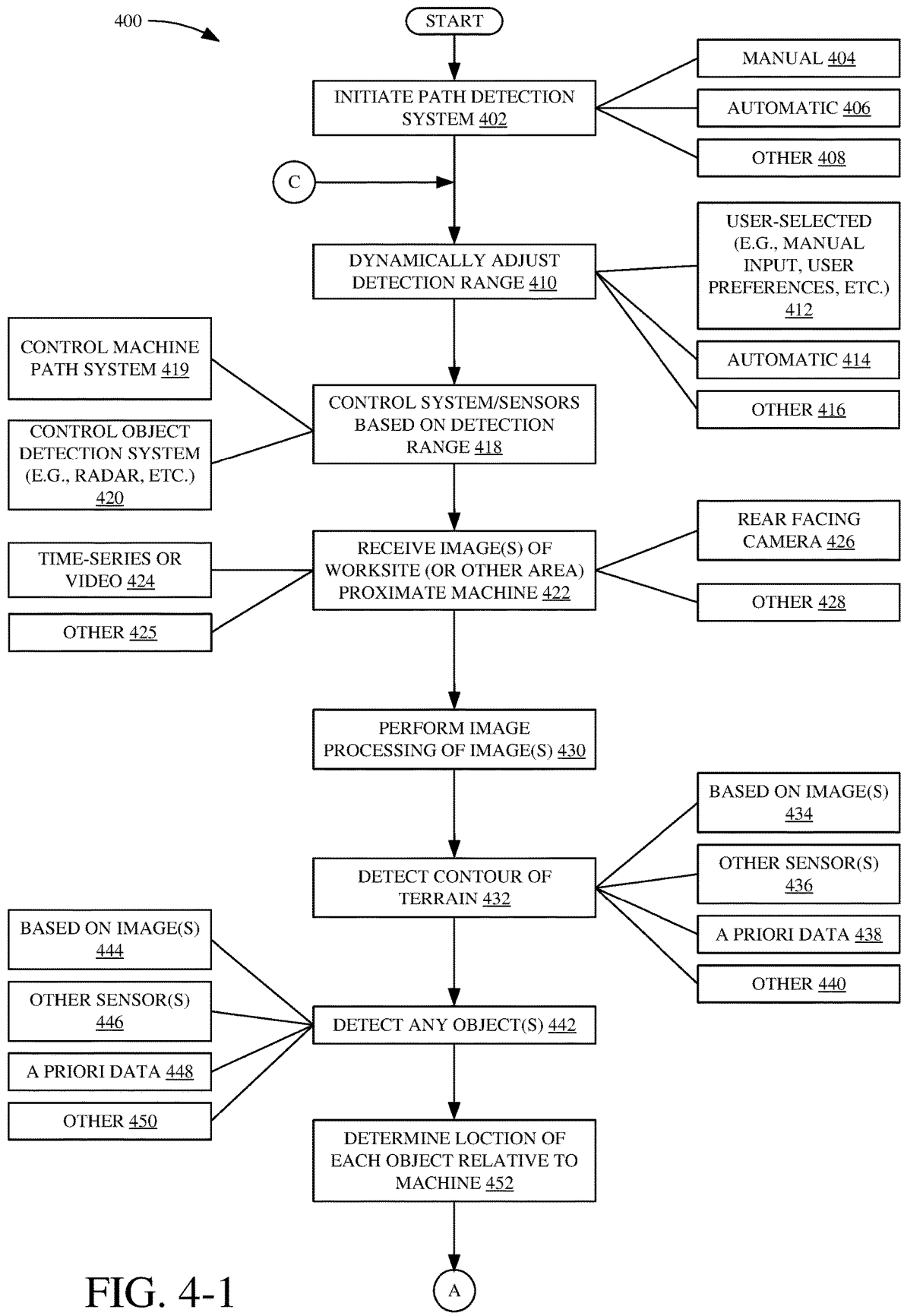
Figures 2, 4:
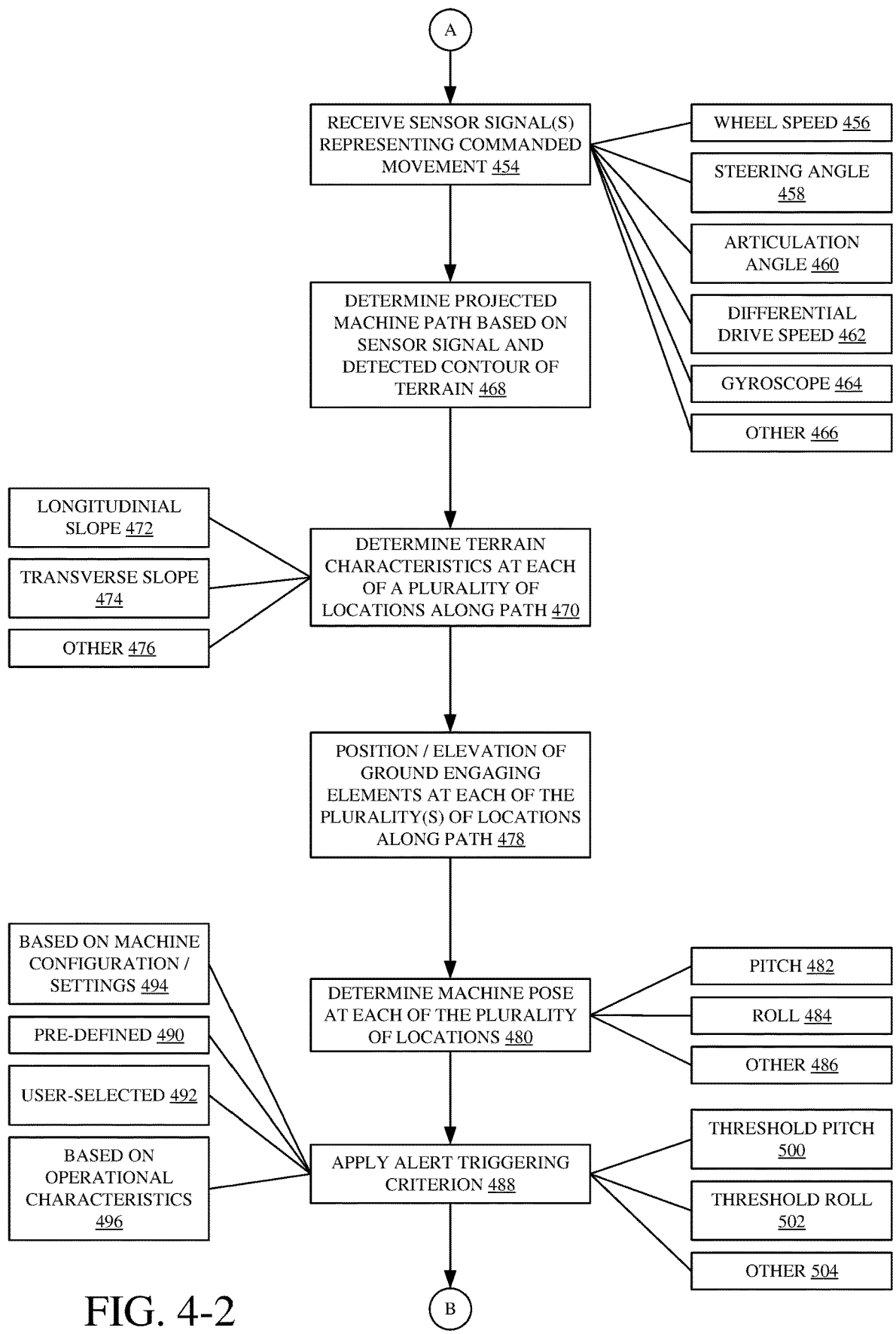
Figures 3, 4:
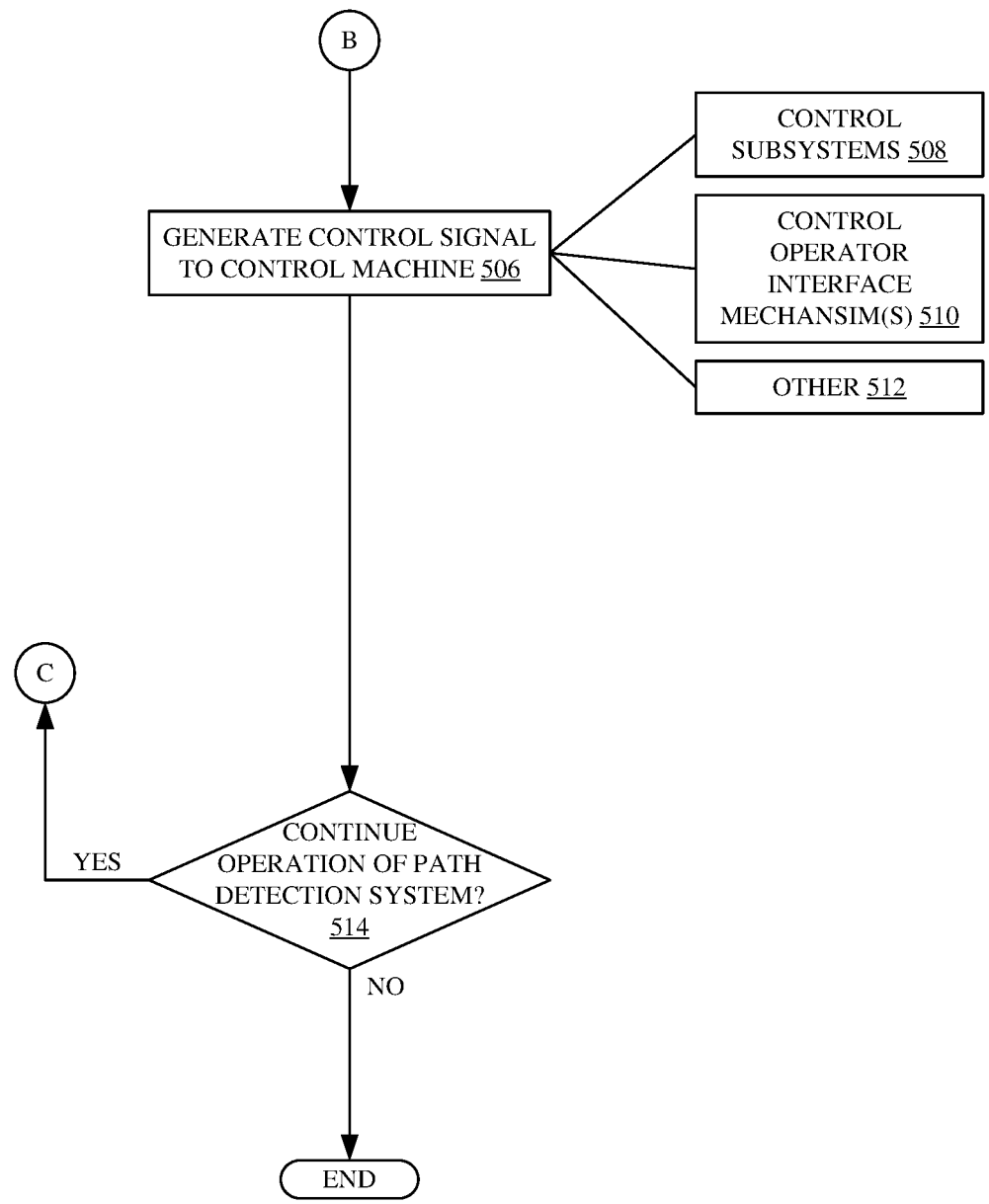
Figure 5:
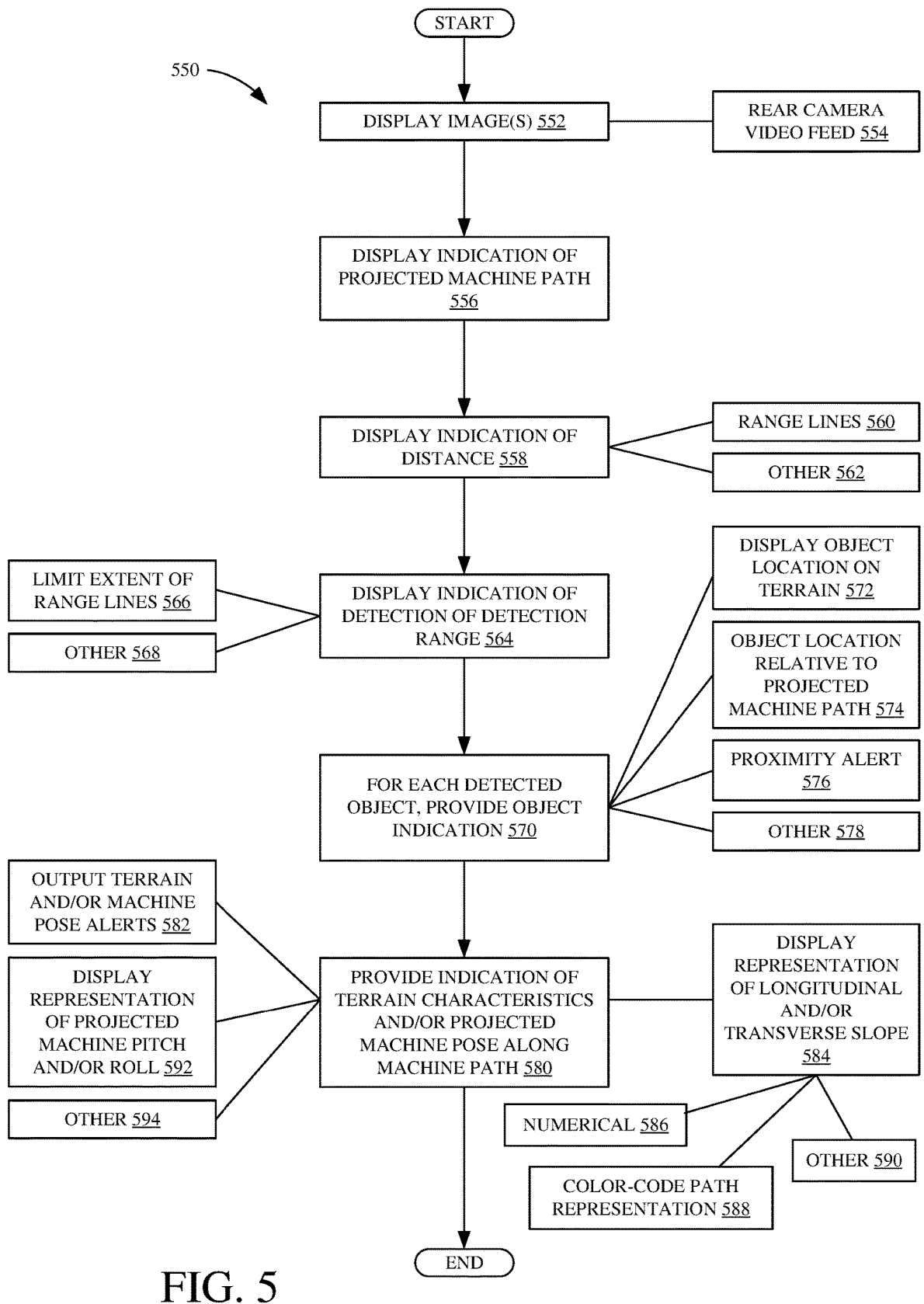
FIG. 5 is a flow diagram illustrating an example operation of a visualization system that generates an operator interface display.

FIG. 5 is a flow diagram 550 illustrating an example operation of visualization system 350 in generating an operator (or user) interface display (such as at block 510 in FIG. 4). FIG. 5 will be discussed in conjunction with FIG. 6, which illustrates an example user interface display 600.

Figure 6:
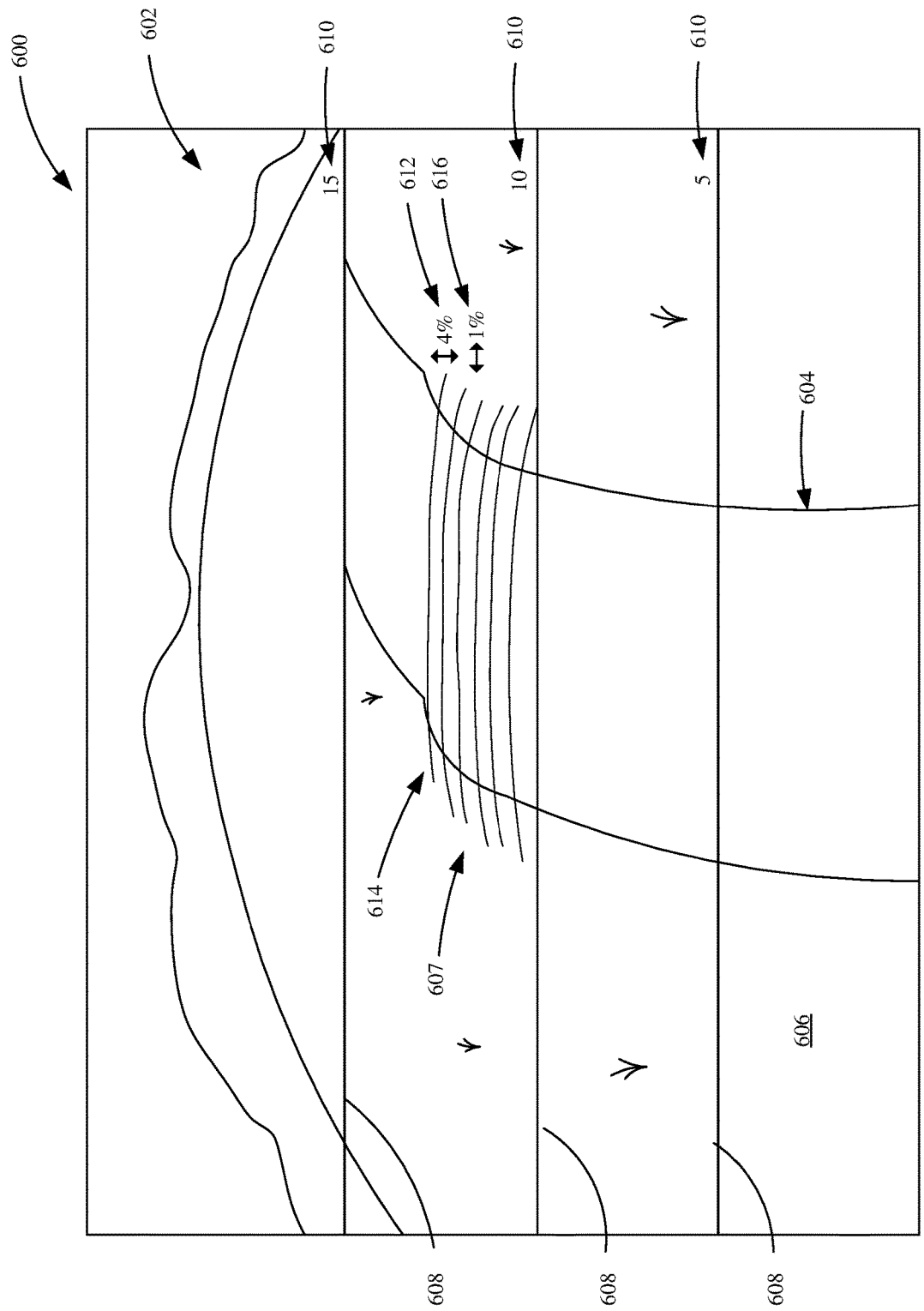
FIG. 6 illustrates an example user interface display that shows a path of a mobile machine in multiple dimensions.

At block 552, images acquired by imaging sensor(s) 140 are displayed. For instance, this can include a rear camera video feed, at block 554. As shown in FIG. 6, user interface display 600 displays an image 602 taken from a rear facing camera on machine 102.

At block 556, an indication 604 of the projected machine path is displayed. In FIG. 6, this is shown as an overlay that indicates a projected path of the ground engaging elements of machine 102 along the terrain 606. Illustratively, terrain 606 includes one or more elevation changes or features, such as a mound or hill 607. Accordingly, the overlay of indication 604 is provided in multiple dimensions, to represent that the project machine path with traverse hill 607. That is, the overlay not constrained to a horizontal x-y ground plane, but rather indicates height changes of the project machine path in the z (i.e., vertical) direction.

At block 558, an indication of distance(s) is provided on display 600. For instance, this can include range lines, as represented at block 560. For instance, in the example of FIG. 6, range lines 608 are displayed, that indicate a distance, relative to machine 102 at various locations in image 602. Each range line 608 can have a numerical indicator 610, indicating the distance represented by the corresponding range line 608. Of course, the distances can be displayed in other ways as well. This is represented by block 562.

At block 564, an indication of the detection range is displayed. As noted above, the detection range can be dynamically selected by system 342 in any of a number of ways. In one example of block 564, the extent of the range lines 608 is limited, to indicate the detection range. This is represented by block 566. For example, in FIG. 6 the detection range is set to fifteen feet. Accordingly, the furthest range line 608 display in display 600 corresponds to the fifteen foot detection range. Of course, the detection range can be displayed in other ways as well. This is represented by block 568. For example, visual indicia, such as a numerical indicator, a color-coded indicator, etc., can be displayed on display 600 to indicate the detection range.

At block 570, indications of any detected objects are displayed. For instance, this can include displaying an indication of the object location on the terrain. This is represented by block 572. For instance, a portion of the image displayed in display 600 can be highlighted or otherwise provided with visual indicia indicating the presence of an object in the image. Alternatively, or in addition, the location of the object relative to the projected machine path can be displayed. This is represented by block 574. For instance, if the object overlaps a portion of the projected machine path, display 600 can be modified to indicate this, such as by changing the color of indicator 604, or otherwise rendering an output to operator 108 indicating that a detected object lies within the projected machine path. Also, a proximity alert can be provided as well. This is represented by block 576. For instance, if the object is within a threshold distance from machine 102, a visual and/or audible alert can be provided to operator 108. Of course, indications of the detected objects can be provided in other ways as well. This is represented at block 578.

At block 580, an indication of the terrain characteristics and/or machine pose can be provided. In one example, this can include outputting terrain and/or machine pose alerts at block 582. Example of such alerts are discussed above with respect to block 488 in FIG. 4.

In one example of block 580, a representation of the longitudinal and/or transverse slope of the terrain is displayed. This is represented at block 584. For instance, one or more numerical indicators 612 are displayed at a location on display 600 and indicate terrain slope (e.g., in terms of degrees) of a portion of terrain 606 corresponding to the location in the image. This is represented at block 586. Illustratively, a first indicator 612 indicates that region 614 of terrain 606 has a longitudinal slope of four degrees, and a second indicator 616 indicates region 614 of terrain 606 has a transverse slope of one degree. As noted above, alerts can be rendered if the slope characteristics met alert triggering criterion (e.g., one or more of indicators 612 and 616 indicate a slope above a threshold).

Alternatively, or in addition, representations of the slope can be provided by color-coding portions of the map (block 588), or it can be provided in other ways as well (represented by block 590).

Also, representations of the projected machine pitch and/or roll can be displayed at block 592. For example, as discussed above, based on the known locations of the ground engaging traction elements relative to the projected machine path, logic 336 can determine the pose of the machine at each of a plurality of locations along the path. This can also take into account machine configurations, such as load being carried by machine 102, suspension characteristics, etc. An indication of this can be displayed on display 600, in any of a number of ways. Again, a numerical indication can be provided, a color-coded indicia can be displayed. These, of course, are for sake of example only. Indications of the terrain characteristics and/or machine pose can be provided in other ways as well. This is represented by block 594.

Figure 7:
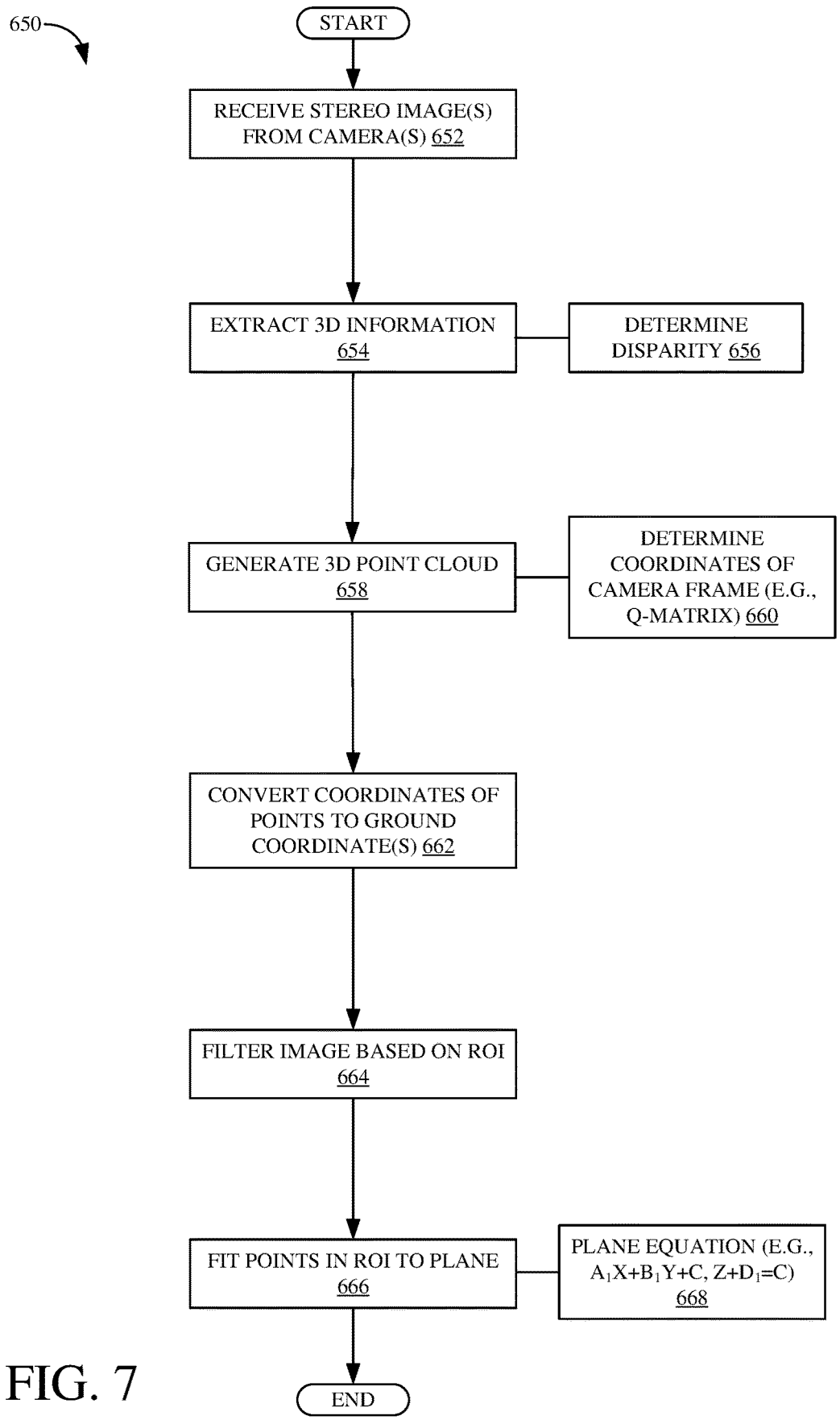
FIG. 7 is a flow diagram illustrating an example calibration operation for a machine path detection system.

FIG. 7 is a flow diagram 650 illustrating an example calibration operation for machine path detection system 126. The calibration operation can be performed at a pre-defined or selected time, such as during an initial operation of machine 102, prior to a particular worksite operation using machine 102, or otherwise. In one example, the calibration operation is performed with machine 102 placed on a known surface, such as relatively flat ground.

At block 652, stereo image(s) are received from a stereo camera, or other imaging sensor 140, of machine 102. At block 654, three-dimensional information is extracted from the stereo images. In one example, this includes determining disparity or displacement between points or pixels detected in the image. This is represented at block 656. From this extracted information, a three-dimension point cloud is generated at block 658. The points in the point cloud represent detected pixels, or groups of pixels, in the image. From this point cloud, coordinates of the camera frame can be determined at block 660. In one example, this includes using a Q-matrix.

At block 662, the coordinates of the points detected from the image are converted or correlated to ground coordinates. Thus, block 662 correlates the detected points from the image to ground coordinates, that can be correlated to the position of machine 102.

At block 664, the image is filtered based on a region of interest (ROI). The region of interest can be determined in any of a variety of ways. In one example, the region of interest can be determined based on the area for which the machine path detection and visualization will be performed. For instance, in the case of a backup camera, the region of interest can be correlated to the machine path.

At block 666, the points in the region of interest are fit to the reference plane. In one example, surface reconstruction is performed from the point cloud by predicting the projection of a grid point to the surface using regression. This operates to fit the points to a plane equation. This is represented at block 668. In one example, the plane equation is expressed as $a_1x+b_1y+c_1z+d_1=0$, where the variables $a_1$, $b_1$, $c_1$, and $d_1$ represent the location of the point on the plane in a Cartesian coordinate system. The reference plane determined using the plane equation represents the location of the ground surface relative to the machine when the machine is placed on a substantially flat surface.

Figures 1, 8:
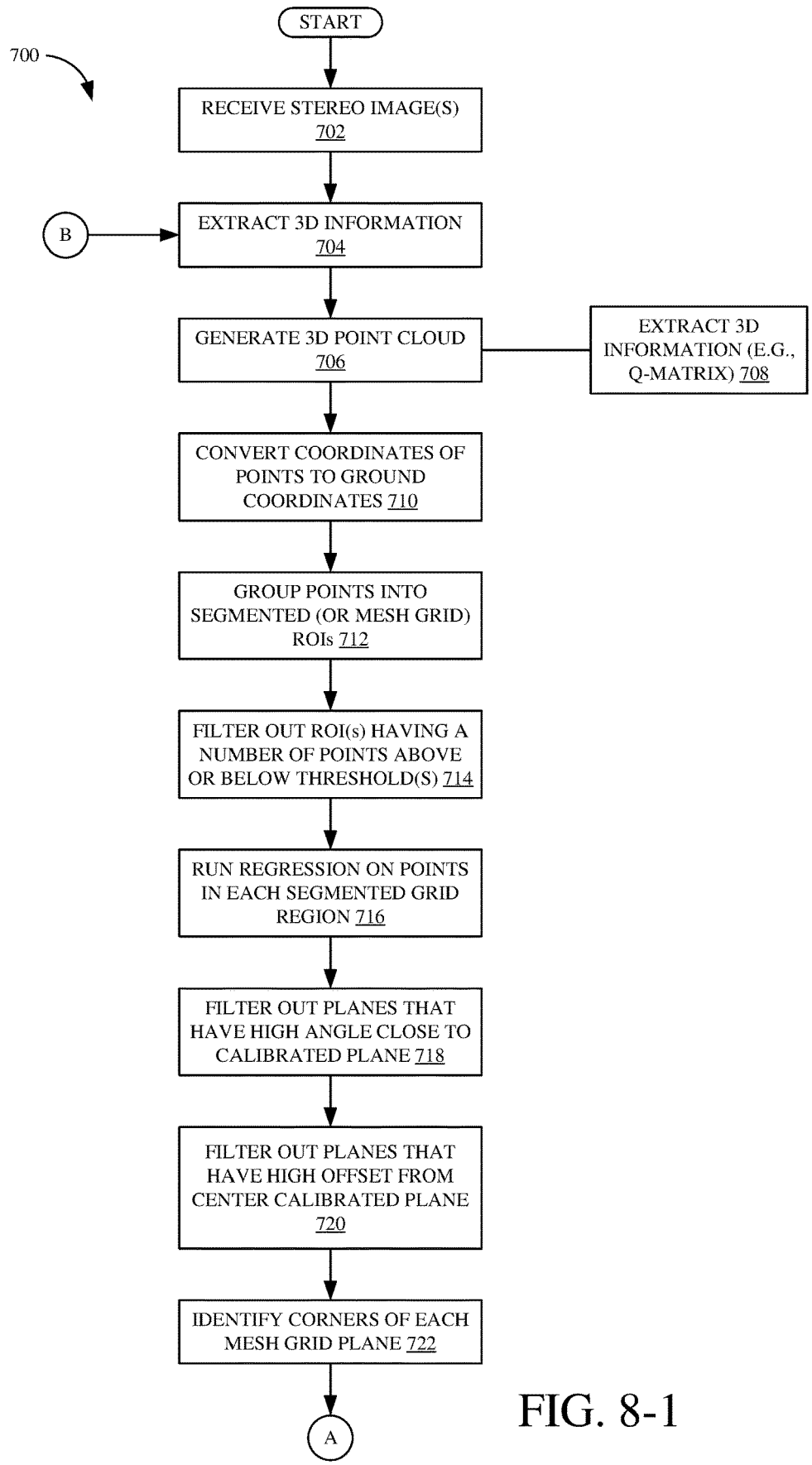
Figures 2, 8:
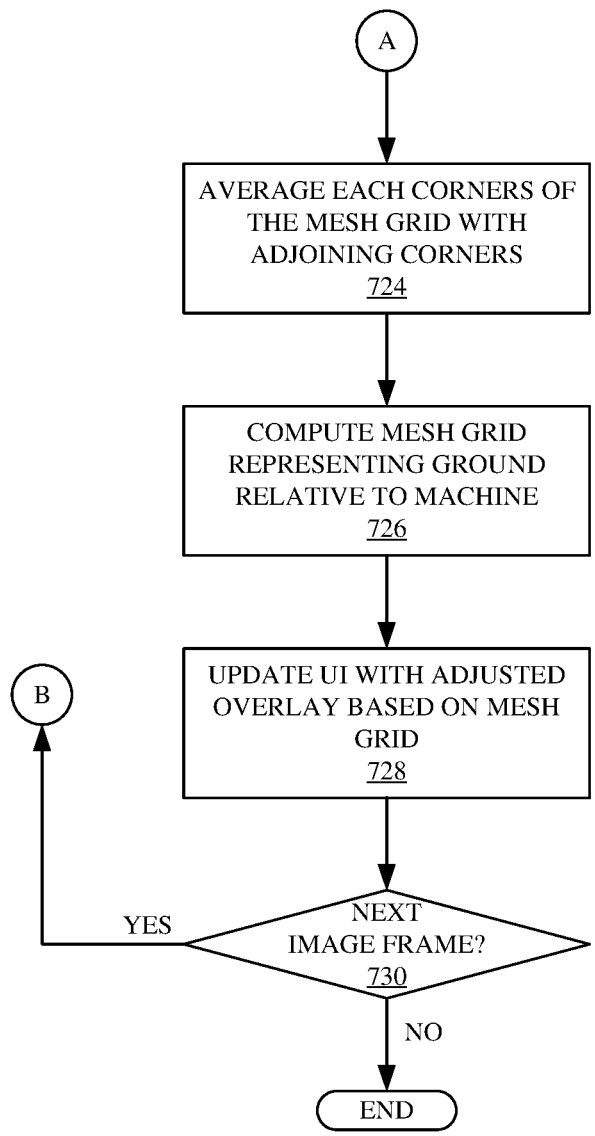

FIGS. 8-1 and 8-2 (collectively referred to as FIG. 8) provide a flow diagram 700 illustrating an example operation of machine path detection system 126 using the calibration performed in FIG. 7. The illustrated process is configured to reconstruct the surface of the terrain from a point cloud generated from RGB images or depth maps.

Figure 9:
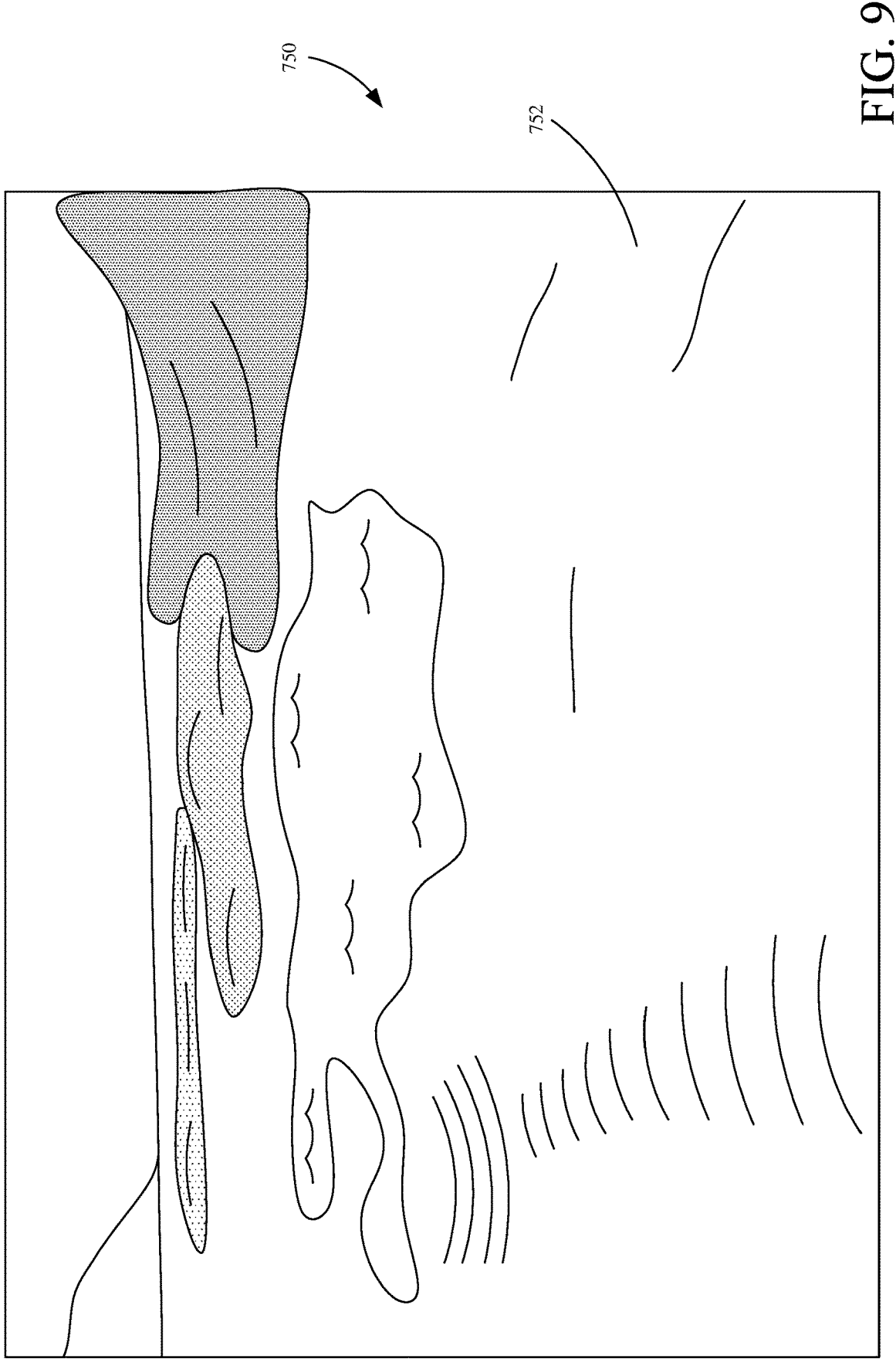
FIG. 9 illustrates an example image obtained from a rear-facing camera on a mobile machine.

At block 702, stereo image(s) are received, and three-dimensional information is extracted at block 704. FIG. 9 illustrates one example of an image 750 obtained from a rear-facing camera of machine 102. As shown in FIG. 9, image 750 shows the terrain 752 having a number of contour features.

A 3D point cloud is generated at block 706, such as by extracting 3D information using a Q-matrix, or other process. This is represented by block 708. The coordinates of points in the 3D point cloud are converted to ground coordinates at block 710. In one example, blocks 702-710 are similar to blocks 652-662 discussed above with respect to FIG. 7.

At block 712, points are grouped into segmented or mesh grid regions of interest. Regions of interest can be filtered out having a number of points that are above or below threshold(s). This is represented at block 714. For instance, if a region of interest has a number of points that is above a threshold, it can be removed from subsequent processing. Similarly, if a region of interest has a number of points below a threshold, the region of interest can also be removed. In one example, the filtering at block 714 operates to remove areas of the image that represent objects. That is, if an area of the image represents a stack of material, such as building materials, etc., the point detected in the image corresponding to those materials is filtered out so as to remove it from the determination of the ground contour.

At block 716, a regression operation is run on the points in each segmented grid region. Planes that have a high angle close to the calibrated plane can be filtered out. This is represented at block 718. Similarly, planes that have a high offset from the center calibrated plane can also be filtered out at block 720. Again, the filtering at blocks 718 and 720 can identify areas where the plane is very steep, or is otherwise unlikely to represent the terrain. For example, an area in the image that represents a stack of building materials or machine equipment (e.g., tires) results in a plane that is very steep relative to the adjoining planes, and is thus determined to represent an area other than the ground. The determination as to the angle of the plane can be determined in any of a number of ways. In one example, a running average of a predetermined number of planes (e.g., ten planes, etc.) is utilized to determine whether a given plane has a high angle or high offset relative to the adjacent planes.

At block 722, corners of each mesh grid plane are identified and, at block 724, and the corners of each mesh grid is averaged with adjoining corners. The mesh grid of the ground is computed, relative to the machine, at block 726. The mesh grid represents the three-dimensional contour of the terrain in a region of interest relative to the machine.

Figures 2, 10:
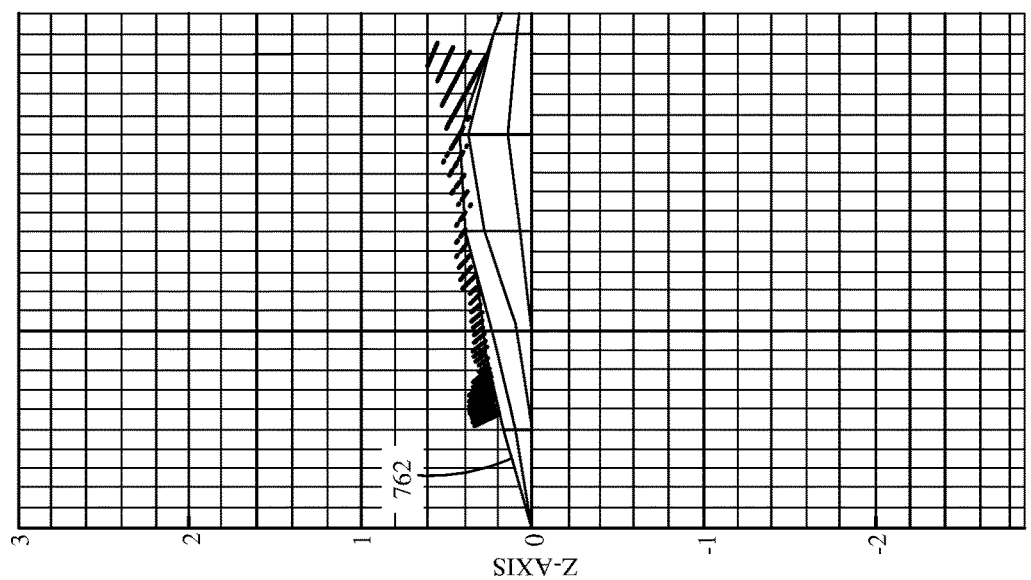
Figures 1, 10:
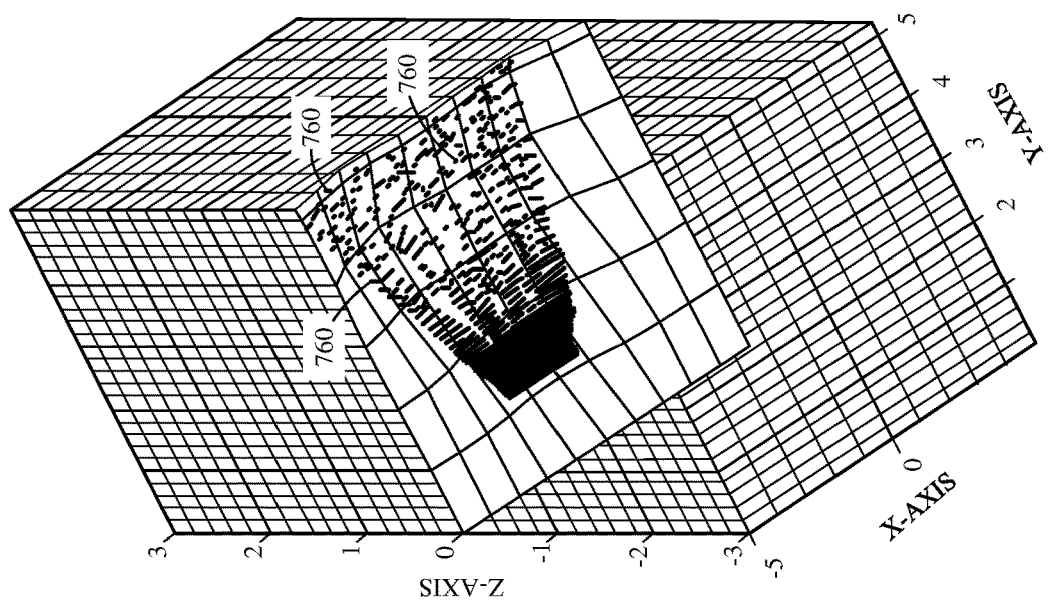

FIGS. 10-1 and 10-2 (collectively referred to as FIG. 10) illustrate one example of a mesh grid generated from image 750 shown in FIG. 9. As illustrated, a number of points 760 are generated from the segmented grid regions. Those planes are meshed together, to form the mesh grid 762 representing the terrain contour. Referring again to FIG. 8, at block 728, control system 104 can generate a control signal to update the operator interface with the adjusted overlay based on the calculated mesh grid. At block 730, the process can be continued for any subsequent image frames acquired by the camera.

Some mobile machines utilize a backup camera which displays a rear view from the machine to the operator, along with an indication of the machine path. The indication includes an overlay, such as lines that bend to represents the machine's trajectory while turning. The overlay appears on top of a rear camera image and is projected on a horizontal plane, which bends in the horizontal plane only. Therefore, while such a system visually covers the area directly behind the machine that cannot be seen by the operator using mirrors, it is often difficult for the operator to determine the effect of the terrain on machine movement. For instance, there is no indication of a slope or pitch of the terrain which could cause unstable machine positions and/or contact with the terrain or other objects.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 11:
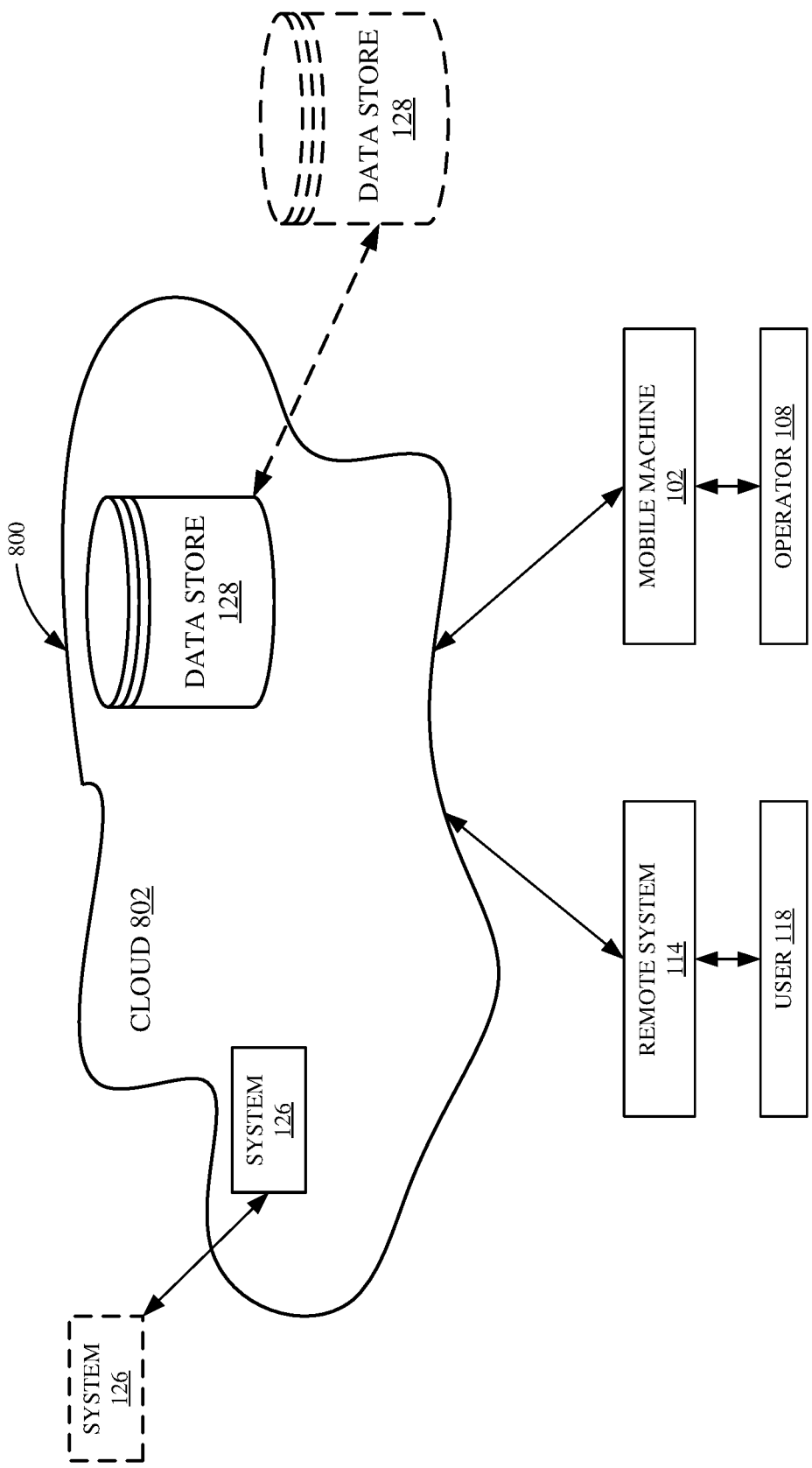
FIG. 11 is a block diagram showing one example of the architecture illustrated in FIG. 1, deployed in a remote server architecture.

FIG. 11 is a block diagram of one example of mobile machine architecture 100, shown in FIG. 1, where mobile machine 102 communicates with elements in a remote server architecture 800. In an example, remote server architecture 800 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 11, some items are similar to those shown in FIG. 1 and they are similarly numbered. FIG. 11 specifically shows that machine path detection system 126 and data store 128 can be located at a remote server location 802. Therefore, mobile machine 102 accesses those systems through remote server location 802.

FIG. 11 also depicts another example of a remote server architecture. FIG. 11 shows that it is also contemplated that some elements of FIG. 1 are disposed at remote server location 802 while others are not. By way of example, data store 128 can be disposed at a location separate from location 802, and accessed through the remote server at location 802. Alternatively, or in addition, machine path detection system 126 can be disposed at location(s) separate from location 802, and accessed through the remote server at location 802.

Regardless of where they are located, they can be accessed directly by mobile machine 102, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the mobile machine comes close to the fuel truck for fueling, the system automatically collects the information from the machine or transfers information to the machine using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile machine until the mobile machine enters a covered location. The mobile machine, itself, can then send and receive the information to/from the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 12:
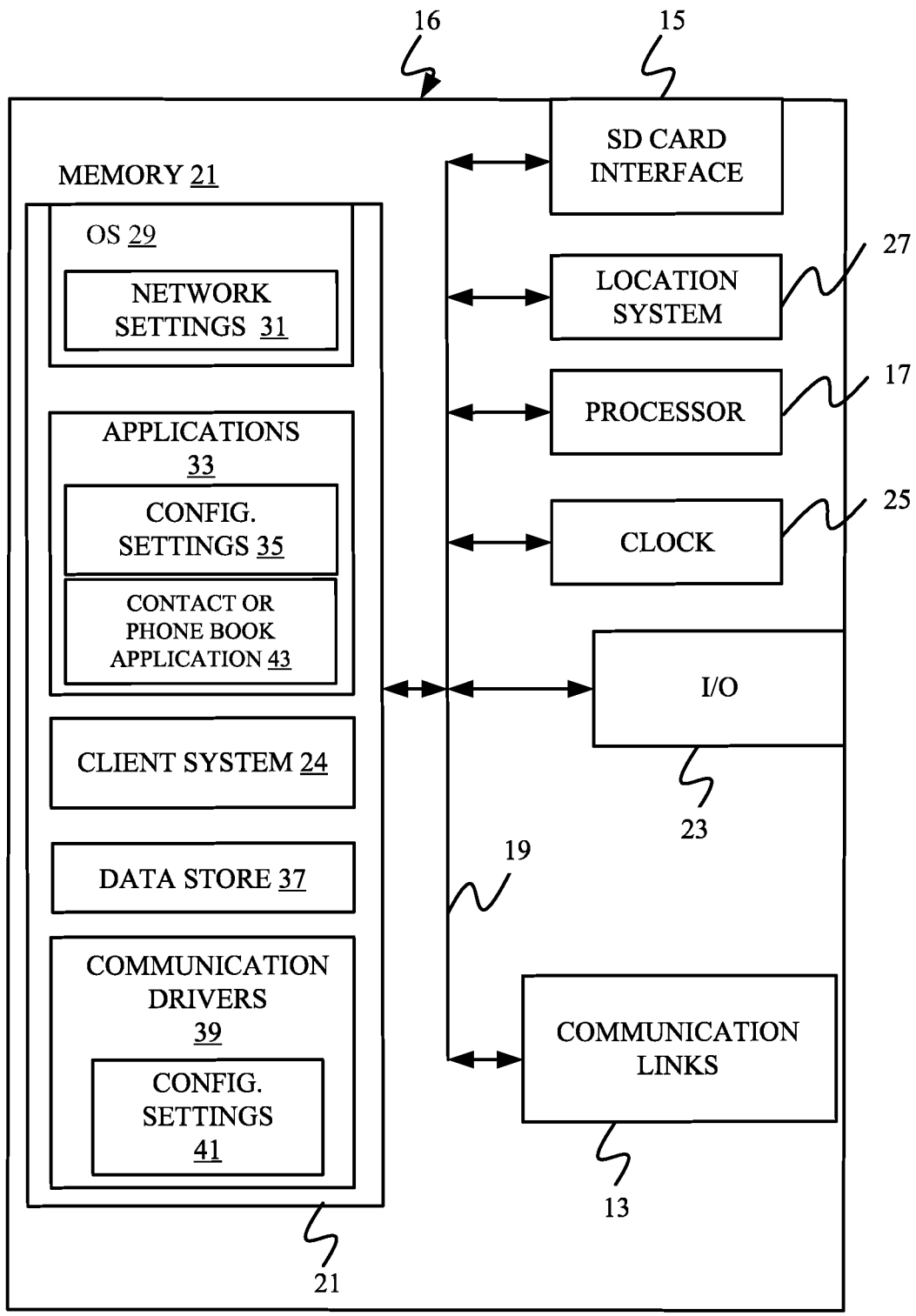
FIGS. 12-14 show examples of mobile devices that can be used in the architectures shown in the previous figures.
Figure 13:
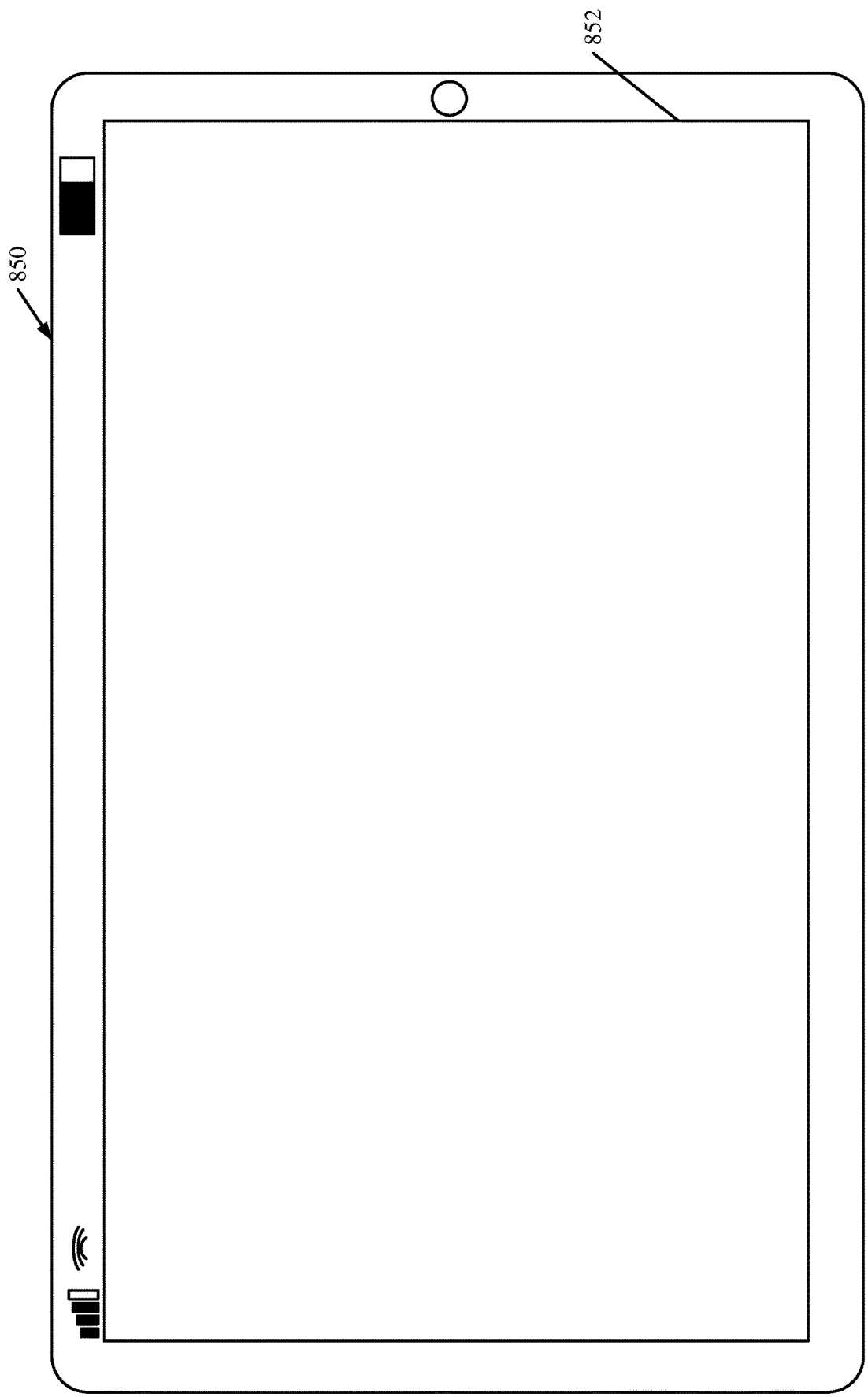
Figure 14:
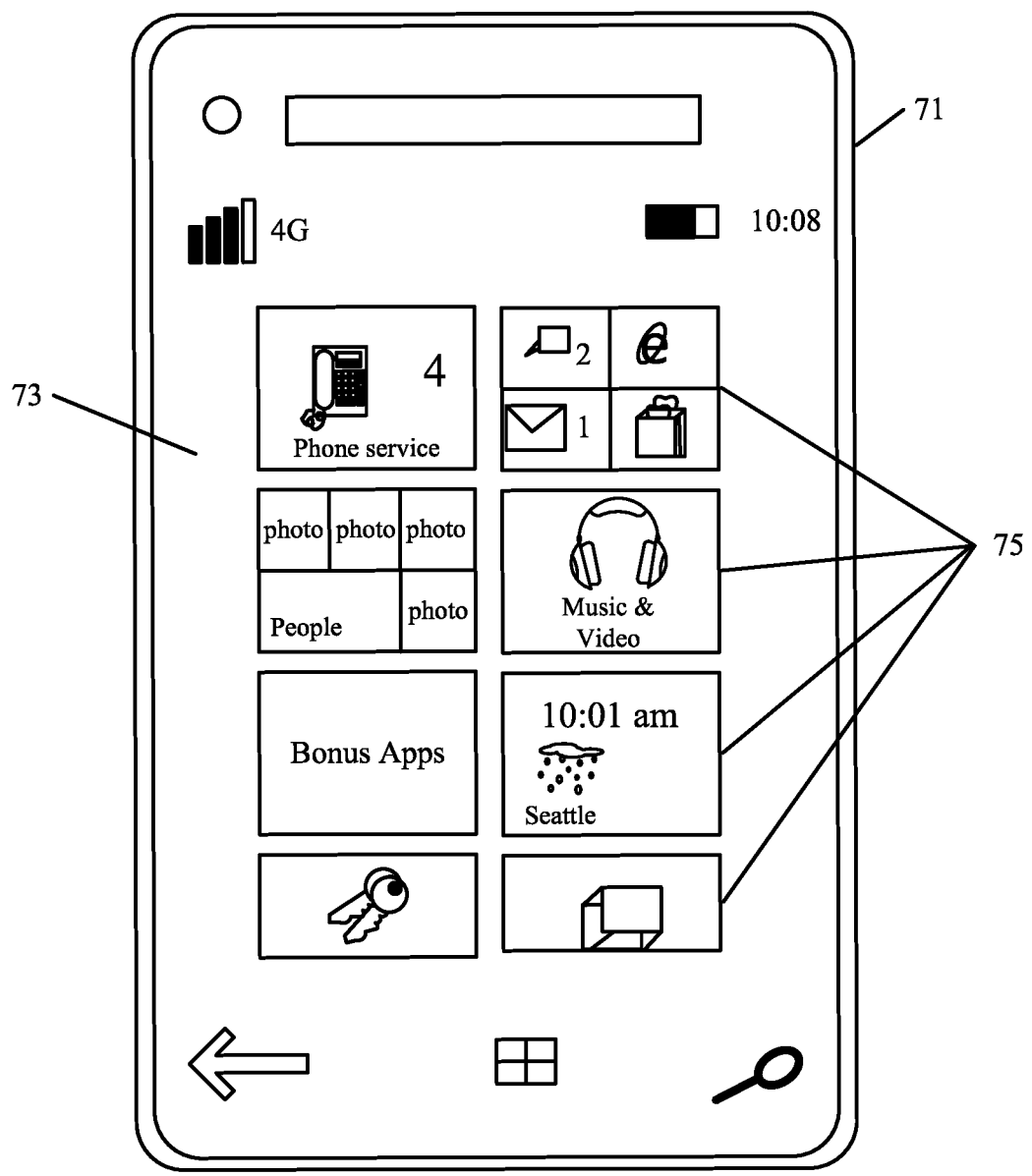

FIG. 12 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 102 or as remote system 114. FIGS. 13-14 are examples of handheld or mobile devices.

FIG. 12 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 13 shows one example in which device 16 is a tablet computer 850. In FIG. 13, computer 850 is shown with user interface display screen 852. Screen 852 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 850 can also illustratively receive voice inputs as well.

FIG. 14 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 15:
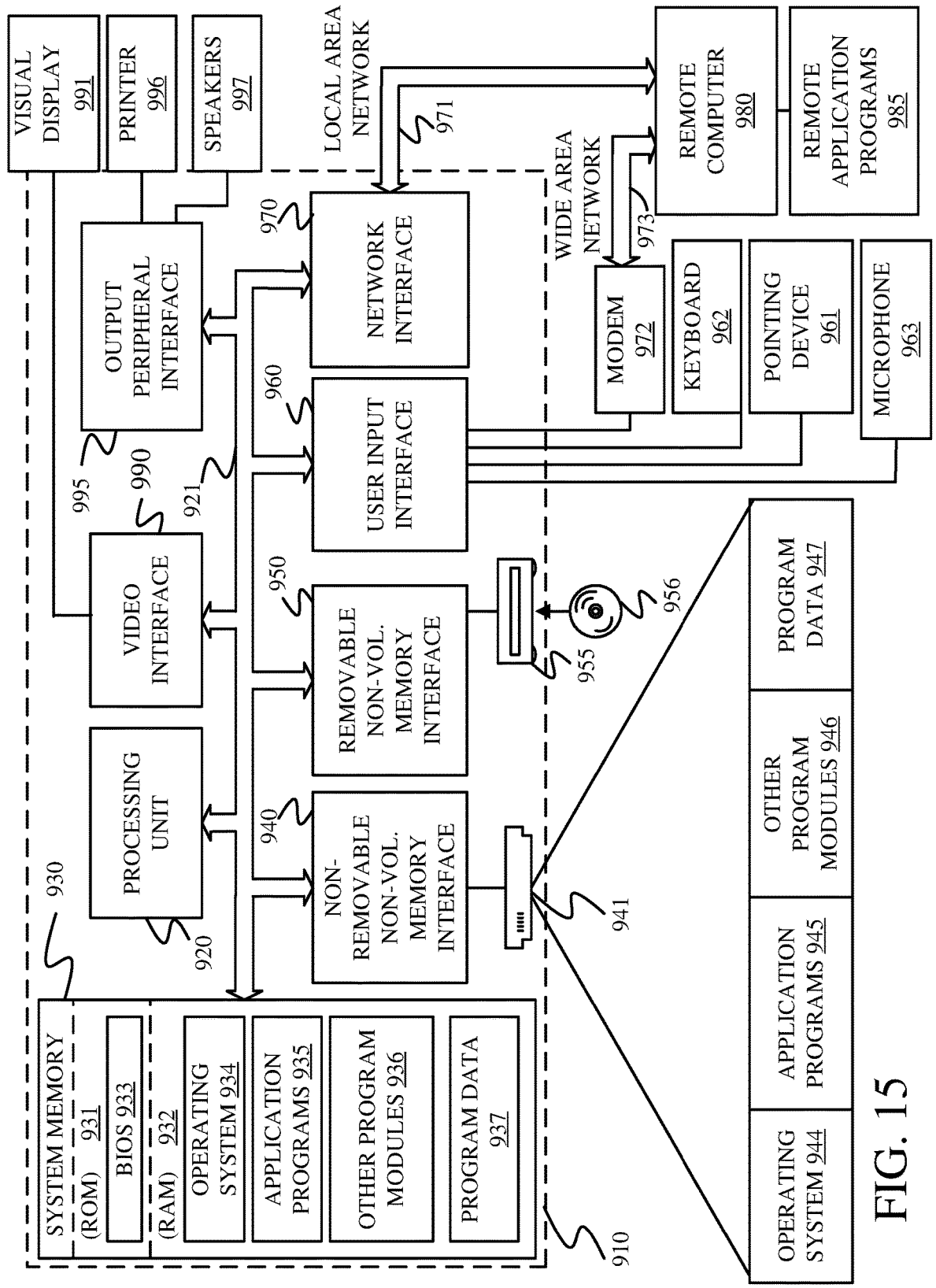
FIG. 15 is a block diagram showing one example of a computing environment that can be used in the architectures shown in the previous figures.

FIG. 15 is one example of a computing environment in which elements of FIG. 1, or parts of it, (for example) can be deployed. With reference to FIG. 15, an example system for implementing some embodiments includes a computing device in the form of a computer 910. Components of computer 910 may include, but are not limited to, a processing unit 920 (which can comprise processors or servers from previous FIGS.), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. Memory and programs described with respect to FIG. 1 can be deployed in corresponding portions of FIG. 15.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 15 illustrates operating system 934, application programs 935, other program modules 936, and program data 937.

The computer 910 may also include other removable/non-removable volatile/nonvolatile computer storage media. By way of example only, FIG. 15 illustrates a hard disk drive 941 that reads from or writes to non-removable, nonvolatile magnetic media, an optical disk drive 955, and nonvolatile optical disk 956. The hard disk drive 941 is typically connected to the system bus 921 through a non-removable memory interface such as interface 940, and optical disk drive 955 is typically connected to the system bus 921 by a removable memory interface, such as interface 950.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 15, provide storage of computer readable instructions, data structures, program modules and other data for the computer 910. In FIG. 15, for example, hard disk drive 941 is illustrated as storing operating system 944, application programs 945, other program modules 946, and program data 947. Note that these components can either be the same as or different from operating system 934, application programs 935, other program modules 936, and program data 937.

A user may enter commands and information into the computer 910 through input devices such as a keyboard 962, a microphone 963, and a pointing device 961, such as a mouse, trackball or touch pad. Other input devices (not shown) may include a joystick, game pad, satellite dish, scanner, or the like. These and other input devices are often connected to the processing unit 920 through a user input interface 960 that is coupled to the system bus, but may be connected by other interface and bus structures. A visual display 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 is operated in a networked environment using logical connections (such as a local area network—LAN, or wide area network—WAN or a controller area network—CAN) to one or more remote computers, such as a remote computer 980.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. In a networked environment, program modules may be stored in a remote memory storage device. FIG. 15 illustrates, for example, that remote application programs 985 can reside on remote computer 980.

It should also be noted that the different examples described herein can be combined in different ways. That is, parts of one or more examples can be combined with parts of one or more other examples. All of this is contemplated herein.

Example 1 is a method of controlling a mobile machine having a set of ground engaging elements, the method comprising:
  receiving an image of terrain proximate the mobile machine;
  detecting a contour of the terrain;
  determining a projected path of the set of ground engaging elements based on the detected contour of the terrain; and
  controlling a display device to display the image with an overlay representing the projected path of the ground engaging elements.

Example 2 is the method of any or all previous examples, wherein the overlay comprises a multi-dimensional overlay representing projected movement of the mobile machine in multiple dimensions.

Example 3 is the method of any or all previous examples, wherein the multi-dimensional overlay represents a slope of the terrain along a projected path of the set of ground engaging elements.

Example 4 is the method of any or all previous examples, wherein the multi-dimensional overlay represents a projected change in elevation of the set of ground engaging traction elements.

Example 5 is the method of any or all previous examples, wherein the overlay represents a projected change in pitch of the mobile machine along the machine path.

Example 6 is the method of any or all previous examples, wherein the overlay represents a projected change in roll of the mobile machine along the machine path.

Example 7 is the method of any or all previous examples, and further comprising:
  receiving an indication of an object detected on the terrain;
  determining a location of the object relative to the machine path; and
  displaying an object indicator representing the location of the object relative to the machine path.

Example 8 is the method of any or all previous examples, and further comprising displaying an indication of a distance of the object from the mobile machine.

Example 9 is the method of any or all previous examples, wherein the indication comprises one or more range lines.

Example 10 is the method of any or all previous examples, and further comprising:
  receiving a range input;
  based on the range input, selecting a detection range; and
  generating the overlay based on the detection range.

Example 11 is the method of any or all previous examples, and further comprising displaying a range indicator that indicates the selected detection range.

Example 12 is the method of any or all previous examples, wherein the mobile machine comprises a frame, and a tool that is supported by the frame and configured to move material on a worksite.

Example 13 is the method of any or all previous examples, and further comprising determining the path based on at least one of:
  a steering angle;
  a differential drive speed of a first ground engaging element relative to a second ground engaging element; or
  an articulation angle of the mobile machine.

Example 14 is a mobile machine comprising:
  a set of ground engaging elements;
  an imaging sensor configured to generate a signal representing a terrain proximate the mobile machine;
  a terrain detection system configured to detect a contour of the terrain;
  a machine path system configured to determine a path of the set of ground engaging elements based on the detected contour of the terrain; and
  a visualization system configured to generate a user interface display that includes:
    an image of the terrain based on the signal generated by the imaging sensor; and
    an overlay representing the path of the ground engaging elements.

Example 15 is the mobile machine of any or all previous examples, wherein the overlay comprises a multi-dimensional overlay representing projected movement of the mobile machine in multiple dimensions.

Example 16 is the mobile machine of any or all previous examples, wherein the overlay represents at least one of:
  a projected change in pitch of the mobile machine along the machine path, or
  a projected change in roll of the mobile machine along the machine path.

Example 17 is the mobile machine of any or all previous examples, and further comprising:
  a range control system configured to:
    receive a range input;
    based on the range input, select a detection range; and
    generate the overlay based on the detection range.

Example 18 a control system for a mobile machine having a set of ground engaging elements, the control system comprising:
  image processing logic configured to receive an image of terrain proximate the mobile machine;
  terrain contour detection logic configured to detect a contour of the terrain;
  projected machine path determination logic configured to determining a projected path of the set of ground engaging elements based on the detected contour of the terrain; and
  user interface logic configured to control a display device to display the image with an overlay representing the projected path of the ground engaging elements.

Example 19 is the control system of any or all previous examples, wherein the overlay comprises a multi-dimensional overlay representing projected movement of the mobile machine in multiple dimensions.

Example 20 is the control system of any or all previous examples, and further comprising:
  range setting logic configured to:
    receive a range input; and
    based on the range input, select a detection range; and
  visualization logic configured to generate a visualization that represents the selected detection range on the display device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a mobile machine having a set of ground engaging elements, the method comprising:
receiving an image of terrain proximate the mobile machine;
detecting a contour of the terrain;
receiving a steering signal representing a direction of travel of the mobile machine on the terrain;
determining a projected path of the set of ground engaging elements based on the detected contour of the terrain and the steering signal; and
controlling a display device to display the image of the terrain with an overlay display element that visually represents a location of the projected path of the ground engaging elements on the image of the terrain, wherein the overlay display element represents a slope of the terrain along the projected path of the set of ground engaging elements and the visual appearance of the overlay display element varies based on changes in the slope of the terrain along the projected path.

2. The method of claim 1, wherein the overlay display element comprises a three-dimensional overlay representing the projected path of the mobile machine in three dimensions, and wherein the mobile machine comprises a frame and a tool that is supported by the frame and configured to move material on a worksite.

3. The method of claim 1, wherein the overlay display element comprises a first display element representing a magnitude of a first slope of the terrain in a first portion of the projected path, and a second display element representing a magnitude of a second slope of the terrain in a second portion of the projected path.

4. The method of claim 3, wherein the overlay display element includes at least one of:
numerical representations of the magnitudes of the first and second slopes of the terrain; or
a color-coded representation of the magnitudes of the first and second slopes of the terrain.

5. The method of claim 1, wherein the overlay display element represents a projected change in elevation of the set of ground engaging elements.

6. The method of claim 1, wherein the overlay display element represents a projected change in at least one of a pitch or a roll of the mobile machine along the machine path.

7. The method of claim 1, and further comprising:
receiving an indication of an object detected on the terrain;
determining a location of the object relative to the machine path; and
displaying an object indicator representing the location of the object relative to the machine path.

8. The method of claim 7, and further comprising displaying an indication of a distance of the object from the mobile machine.

9. The method of claim 8, wherein the indication comprises one or more range lines.

10. The method of claim 1, and further comprising:
receiving a range input;
based on the range input, selecting a detection range; and
displaying a range indicator that indicates the selected detection range.

11. The method of claim 1, wherein the steering signal is received from one or more of a steering angle sensor, an articulation angle sensor, a wheel speed sensor, or a differential drive sensor.

12. The method of claim 1, wherein the steering signal comprises a steering control signal that controls at least one of:
a steering angle of one or more of the ground engaging elements;
a differential drive speed of a first ground engaging element relative to a second ground engaging element; or
an articulation angle of the mobile machine.

13. A mobile machine comprising:
a set of ground engaging elements;
an imaging sensor configured to generate a signal representing a terrain proximate the mobile machine;
a terrain detection system configured to detect a contour of the terrain;
a machine path system configured to determine a projected path of the set of ground engaging elements based on the detected contour of the terrain and a steering input to control a direction of the mobile machine on the terrain; and
a visualization system configured to generate a user interface display that includes:
an image of the terrain based on the signal generated by the imaging sensor; and
an overlay display element positioned at a location that corresponds to the projected path of the ground engaging elements on the image of the terrain and has a visual appearance that identifies changes in slope along the projected path.

14. The mobile machine of claim 13, and further comprising:
a control system configured to receive control inputs and to control the set of ground engaging elements based on the control inputs,
wherein
the machine path system is configured to determine the projected path of the set of ground engaging elements based on the control inputs, and
the overlay display element comprises a three-dimensional overlay representing projected movement of the mobile machine in three dimensions.

15. The mobile machine of claim 13, wherein the visual appearance of the overlay display element varies based on at least one of:
a projected change in pitch of the mobile machine along the projected path of the ground engaging elements, or
a projected change in roll of the mobile machine along the projected path of the ground engaging elements.

16. A control system for a mobile machine having a set of ground engaging elements, the control system comprising:
image processing logic configured to receive an image of terrain proximate the mobile machine;
detection range setting logic configured to set a detection range;
terrain contour detection logic configured to detect a contour of the terrain;
projected machine path determination logic configured to determine a projected path of the set of ground engaging elements based on the detected contour of the terrain; and
user interface logic configured to control a display device to display:

the image of the terrain with an overlay display element that visually represents a location of the projected path of the ground engaging elements, in three dimensions, on the image of the terrain; and a detection range visualization that visually represents the detection range on the image.

17. The control system of claim 16, wherein the terrain contour detection logic is configured to detect the contour of the terrain within the detection range.

18. The control system of claim 16, wherein the user interface logic is configured to generate, on the display of the image, a plurality of range lines representing different distances from the mobile machine, wherein the range line representing the furthest distance from the mobile machine corresponds to the detection range.

19. The control system of claim 16, and further comprising:

an object detection system configured to detect objects within a threshold proximity of the mobile machine based on the detection range, wherein the user interface logic is configured to control the display device to display a representation of the detected objects.

20. The control system of claim 16, wherein the detection range setting logic is configured to:

receive a detection range user input; and set the detection range based on the detection range user input.

* * * * *